(12) United States Patent
Ogura et al.

(10) Patent No.: US 7,907,196 B2
(45) Date of Patent: Mar. 15, 2011

(54) IMAGE SENSING APPARATUS AND IMAGING SYSTEM

(75) Inventors: Masanori Ogura, Atsugi (JP); Toru Koizumi, Yokohama (JP); Tatsuya Ryoki, Chigasaki (JP); Shin Kikuchi, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 315 days.

(21) Appl. No.: 12/207,540

(22) Filed: Sep. 10, 2008

(65) Prior Publication Data

US 2009/0073298 A1    Mar. 19, 2009

(30) Foreign Application Priority Data

Sep. 14, 2007  (JP) ................................ 2007-240182
Aug. 26, 2008  (JP) ................................ 2008-217326

(51) Int. Cl.
*H04N 5/335* (2006.01)
(52) U.S. Cl. ........................ 348/308; 348/297
(58) Field of Classification Search .................. 348/294, 348/297, 308; 250/208.1
See application file for complete search history.

(56) References Cited

U.S. PATENT DOCUMENTS

| | | | |
|---|---|---|---|
| 5,245,203 A | 9/1993 | Morishita et al. | 257/113 |
| 5,698,892 A | 12/1997 | Koizumi et al. | 257/620 |
| 6,188,094 B1 | 2/2001 | Kochi et al. | 257/232 |
| 6,538,693 B1 * | 3/2003 | Kozuka | 348/241 |
| 6,670,990 B1 | 12/2003 | Kochi et al. | 348/310 |
| 6,791,613 B2 | 9/2004 | Shinohara et al. | 348/308 |
| 6,798,453 B1 | 9/2004 | Kaifu | 348/304 |
| 6,960,751 B2 | 11/2005 | Hiyama et al. | 250/308.1 |
| 7,016,089 B2 | 3/2006 | Yoneda et al. | 358/482 |
| 7,110,030 B1 | 9/2006 | Kochi et al. | 348/308 |
| 7,227,208 B2 | 6/2007 | Ogura et al. | 257/292 |
| 7,321,110 B2 | 1/2008 | Okita et al. | 250/208.1 |
| 7,324,144 B1 | 1/2008 | Koizumi | 348/294 |
| 7,348,615 B2 | 3/2008 | Koizumi | 257/292 |
| 7,408,210 B2 | 8/2008 | Ogura et al. | 257/233 |
| 7,429,764 B2 | 9/2008 | Koizumi et al. | 257/292 |
| 7,456,880 B2 | 11/2008 | Okita et al. | 348/243 |
| 7,456,888 B2 | 11/2008 | Kikuchi | 348/308 |
| 2005/0269604 A1 | 12/2005 | Koizumi et al. | 257/291 |
| 2006/0043393 A1 | 3/2006 | Okita et al. | 257/93 |
| 2006/0043440 A1 | 3/2006 | Hiyama et al. | 257/291 |
| 2006/0044439 A1 | 3/2006 | Hiyama et al. | 348/308 |
| 2006/0157759 A1 | 7/2006 | Okita et al. | 257/292 |
| 2006/0158539 A1 | 7/2006 | Koizumi et al. | 348/300 |
| 2006/0158543 A1 | 7/2006 | Ueno et al. | 348/308 |
| 2006/0208291 A1 | 9/2006 | Koizumi et al. | 257/292 |
| 2006/0208292 A1 | 9/2006 | Itano et al. | 257/292 |

(Continued)

FOREIGN PATENT DOCUMENTS

JP    11-150255 A    6/1999

(Continued)

*Primary Examiner* — Tuan Ho
(74) *Attorney, Agent, or Firm* — Fitzpatrick, Cella, Harper & Scinto

(57) ABSTRACT

An image sensing apparatus comprises a pixel including, a column signal line, a readout circuit, an output line, and an output unit. The readout circuit includes a first accumulation unit, a first opening/closing unit, a second accumulation unit, a transmission unit, and a second opening/closing unit. A capacitance of the first accumulation unit is smaller than a capacitance of the second accumulation unit, and the signal held by the second accumulation unit is read out to the output unit based on the capacitance of the second accumulation unit and the capacitance of the output line.

16 Claims, 24 Drawing Sheets

U.S. PATENT DOCUMENTS

| | | | |
|---|---|---|---|
| 2007/0126886 A1 | 6/2007 | Sakurai et al. | 348/222.1 |
| 2008/0024630 A1 | 1/2008 | Hiyama et al. | 348/241 |
| 2008/0036891 A1 | 2/2008 | Ono et al. | 348/308 |
| 2008/0062294 A1 | 3/2008 | Koizumi et al. | 348/300 |
| 2008/0062295 A1 | 3/2008 | Fujimura et al. | 348/301 |
| 2008/0062296 A1 | 3/2008 | Ogura et al. | 348/308 |
| 2008/0211948 A1 | 9/2008 | Kikuchi et al. | 348/302 |
| 2009/0009645 A1 * | 1/2009 | Schrey et al. | 348/308 |
| 2009/0303369 A1 | 12/2009 | Noda et al. | 348/308 |

FOREIGN PATENT DOCUMENTS

| | | |
|---|---|---|
| JP | 2001-045378 A | 2/2001 |
| JP | 2001-245219 A | 9/2001 |
| JP | 2005-348040 A | 12/2005 |
| JP | 2005-348042 A | 12/2005 |
| JP | 2005-354484 A | 12/2005 |

* cited by examiner

FIG. 11
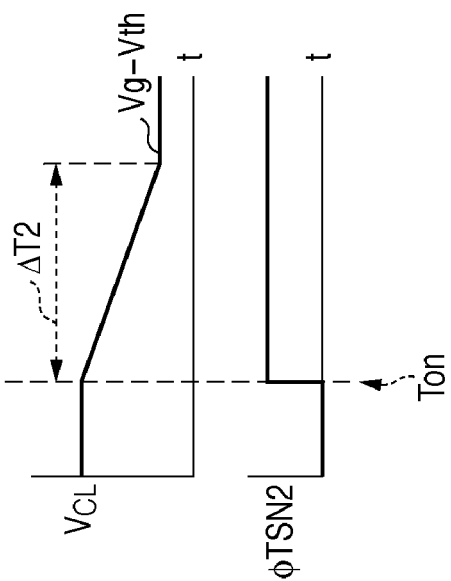
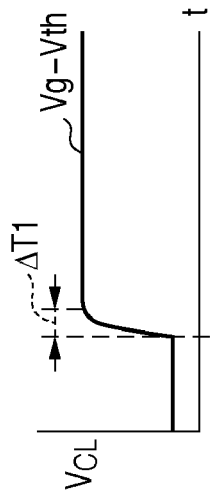
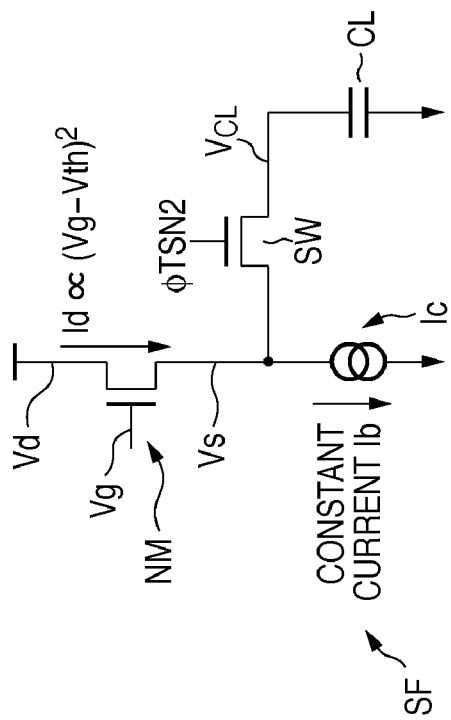

IMAGE SENSING APPARATUS AND IMAGING SYSTEM

BACKGROUND OF THE INVENTION

1. Field of the Invention

The present invention relates to an image sensing apparatus and an imaging system.

2. Description of the Related Art

According to the technique disclosed in Japanese Patent Laid-Open No. 2001-45378, in a pixel array including a plurality of pixels arrayed in the row and column directions, driving signals are supplied to the pixels via a plurality of row control lines extending in the row direction, and signals are read out from the pixels via a plurality of column signal lines extending in the column direction. An accumulation unit is connected to each end of a column signal line. When a signal is being read out from one of the two accumulation units, a signal output from a pixel is accumulated in the other accumulation unit. This shortens the blanking period (period without sensor output) and the entire readout period for reading out signals from the pixel array to the accumulation units.

In the technique of Japanese Patent Laid-Open No. 11-150255, two accumulation units and two amplifiers are alternately connected to each of a plurality of column signal lines. A signal accumulated in one of the two accumulation units is amplified and output by one of the two amplifiers and then accumulated in the other accumulation unit. The signal accumulated in the other accumulation unit is amplified by the other amplifier and then read out to the output line of the succeeding stage.

In the technique of Japanese Patent Laid-Open No. 2001-45378, signals from the pixels of the first row of the pixel array are accumulated in one accumulation unit, whereas signals from the pixels of the second row are accumulated in the other accumulation unit. The signal transferred from each accumulation unit to the output line of the succeeding stage is multiplied by a gain based on a capacitive division ratio determined by the capacitance value of each accumulation unit and that of the output line. For example, when the accumulation unit has a capacitance value C1, and the output line has a capacitance value C2, the gain is given by C1/(C1+C2). The capacitance value of the output line contains its parasitic capacitance and a capacitance value generated by a capacitive element provided on it. In the readout technique of Japanese Patent Laid-Open No. 2001-45378 using such capacitive division, when the absolute value of the capacitance of each of one and other accumulation units is small, the gain based on the capacitive division ratio between the output line of the succeeding stage and the capacitance of each accumulation unit becomes small, and the S/N ratio lowers. Conversely, when the absolute value of the capacitance of each of one and other accumulation units is large, the gain based on the capacitive division ratio between the output line of the succeeding stage and the capacitance of each accumulation unit becomes large, and the S/N ratio rises. However, this increases the electrode area of each of one and other accumulation units, resulting in an increase in the chip area.

According to the technique of Japanese Patent Laid-Open No. 11-150255, the signal accumulated in the other accumulation unit is amplified by the other amplifier and read out to the succeeding stage, as described above. It is therefore possible to read out the signal to the output line of the succeeding stage without considering the gain based on the capacitive division ratio. However, since two amplifiers are connected, for one signal, to each of the plurality of column signal lines, the chip area of the image sensing apparatus may increase. In addition, since two amplifiers operate for reading out one signal, the entire power consumption in the entire readout period in the image sensing apparatus may increase.

SUMMARY OF THE INVENTION

The present invention provides an image sensing apparatus and an imaging system, which can reduce the chip area and suppress an increase in power consumption even in reading out a pixel signal at a high speed.

According to the first aspect of the present invention, there is provided an image sensing apparatus comprising: a pixel including a photoelectric conversion unit; a column signal line connected to the pixel; a readout circuit which reads out a signal from the pixel via the column signal line; an output line connected to the readout circuit and having a capacitance; and an output unit which outputs an image signal in accordance with the signal from the readout circuit via the output line, wherein the readout circuit includes a first accumulation unit which holds the signal read out to the column signal line, a first opening/closing unit which opens/closes connection between the column signal line and the first accumulation unit, a second accumulation unit, a transmission unit which transmits the signal held by the first accumulation unit to the second accumulation unit, and a second opening/closing unit which opens/closes connection between the transmission unit and the second accumulation unit, a capacitance of the first accumulation unit is smaller than a capacitance of the second accumulation unit, and the signal held by the second accumulation unit is read out to the output unit based on the capacitance of the second accumulation unit and the capacitance of the output line.

According to the second aspect of the present invention, there is provided an image sensing apparatus comprising: a first pixel; a second pixel; a column signal line connected to the first pixel and the second pixel; a readout circuit which reads out a signal from the first pixel and the second pixel via the column signal line; a driving unit which drives the first pixel, the second pixel, and the readout circuit; an output line connected to the readout circuit and having a capacitance; and an output unit which outputs an image signal in accordance with the signal from the readout circuit via the output line, wherein the readout circuit includes a first accumulation unit which holds the signal read out to the column signal line, a first opening/closing unit which opens/closes connection between the column signal line and the first accumulation unit, a second accumulation unit, a transmission unit which transmits the signal held by the first accumulation unit to the second accumulation unit and whose input terminal and output terminal are connected to the first accumulation unit and whose output terminal is connected to the second accumulation unit, and a second opening/closing unit which opens/closes connection between the first accumulation unit and the transmission unit, and the second accumulation unit, a capacitance of the first accumulation unit is smaller than a capacitance of the second accumulation unit, the signal held by the second accumulation unit is read out to the output unit based on the capacitance of the second accumulation unit and the capacitance of the output line, and the driving unit drives the first pixel, the second pixel, and the readout circuit to, during a first period, read out a signal of the first pixel from the first accumulation unit and transmit the signal to the second accumulation unit via the transmission unit, and during a second period following the first period, cause the first accumulation unit to accumulate a signal of the second pixel output to the column signal line, and read out the signal of the first pixel from the second accumulation unit and transmit the signal to the output unit.

According to the third aspect of the present invention, there is provided an imaging system comprising the image sensing apparatus according to the first or second aspect of the present invention, an optical system which forms an image on an imaging plane of the image sensing apparatus, and a signal processing unit which processes a signal output from the image sensing apparatus to generate image data.

According to the present invention, it is possible to reduce the chip area and suppress an increase in power consumption even in reading out a pixel signal at high speed.

Further features of the present invention will become apparent from the following description of exemplary embodiments with reference to the attached drawings.

BRIEF DESCRIPTION OF THE DRAWINGS

FIG. 11 is a view for explaining a reset potential;

DESCRIPTION OF THE EMBODIMENTS

The present invention is particularly directed to an image sensing apparatus widely used in a video camera, digital still camera, image input device for image scanner, or the like.

Figure 1:
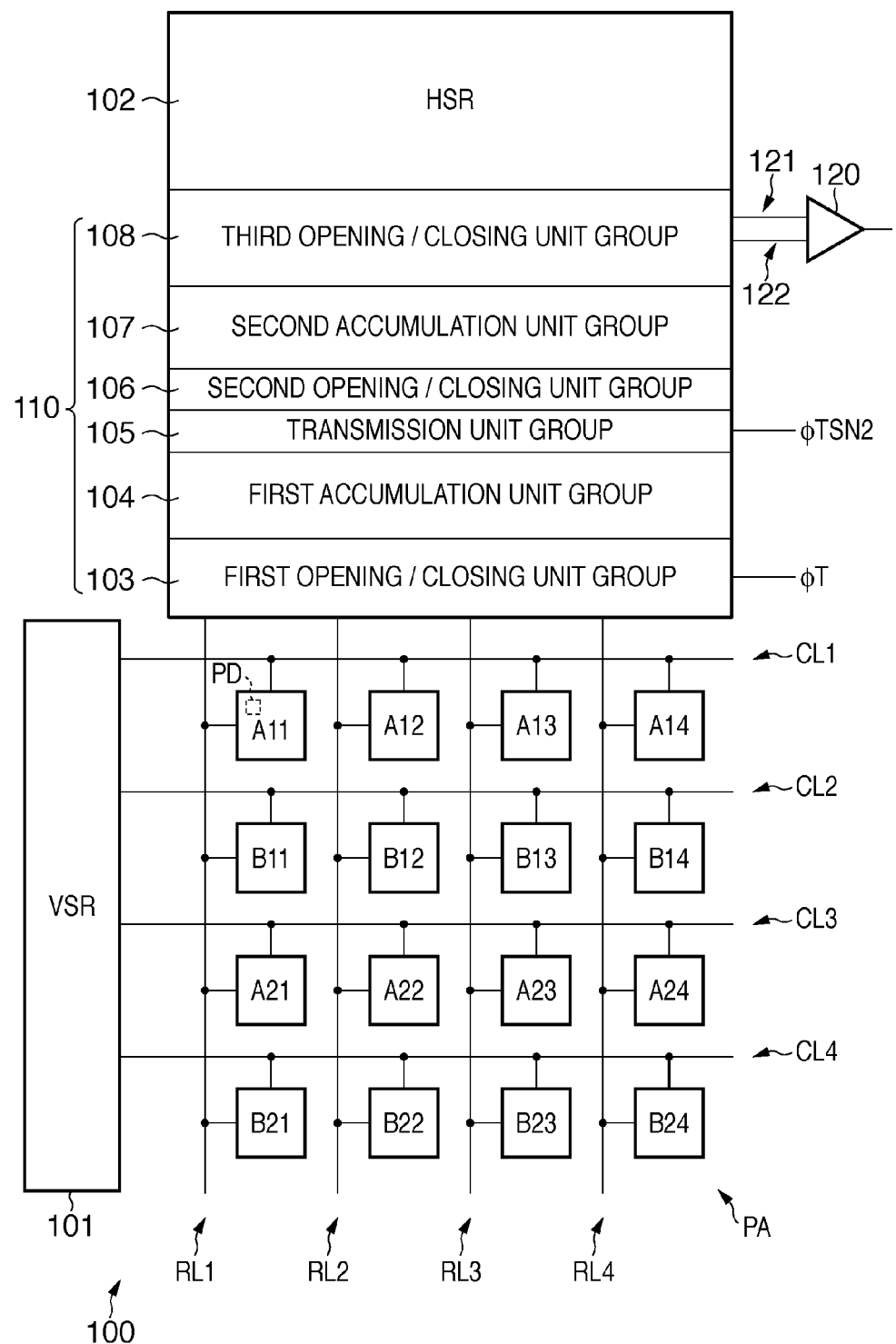
FIG. 1 is a view showing the arrangement of an image sensing apparatus according to the first embodiment of the present invention.

An image sensing apparatus 100 according to the first embodiment of the present invention will be described with reference to FIG. 1. FIG. 1 is a view showing the arrangement of the image sensing apparatus 100 according to the first embodiment of the present invention.

The image sensing apparatus 100 includes a pixel array PA, vertical scanning circuit (VSR, driving unit) 101, readout circuit 110, horizontal scanning circuit (HSR, driving unit) 102, row control lines CL1 to CL4, and column signal lines RL1 to RL4. The image sensing apparatus 100 also has a first horizontal output line 121, second horizontal output line 122, and output unit 120.

The pixel array PA includes a plurality of pixels A11 to B24 which are arrayed two-dimensionally (in a matrix). An array of 4×4 pixels will be exemplified here for descriptive convenience.

Each of the pixels A11 to B24 includes a photoelectric conversion unit PD. The photoelectric conversion unit PD is, for example, a photodiode.

The vertical scanning circuit (VSR) 101 supplies driving signals to the pixels A11 to B24 via the row control lines CL1 to CL4. For example, the vertical scanning circuit (VSR) 101 causes a pixel of each row in the pixel array PA to output a signal to a corresponding one of the column signal lines RL1 to RL4.

The readout circuit 110 reads out signals from the pixels A11 to B24 via the column signal lines RL1 to RL4. The readout circuit 110 includes a first opening/closing unit group 103, first accumulation unit group 104, transmission unit group 105, second opening/closing unit group 106, second accumulation unit group 107, and third opening/closing unit group 108.

The first opening/closing unit group 103 includes a plurality of first opening/closing units provided for the respective columns.

The first accumulation unit group 104 includes a plurality of first accumulation units provided for the respective columns. The first accumulation units hold signals output to the column signal lines RL1 to RL4.

The transmission unit group 105 includes a plurality of transmission units provided for the respective columns. The transmission units transmit the signals held by the first accumulation units to the second accumulation units. The transmission units supply signals corresponding to electric charges held by the first accumulation units to the second accumulation units.

The second opening/closing unit group 106 includes a plurality of second opening/closing units provided for the respective columns. The second accumulation unit group 107 includes a plurality of second accumulation units provided for the respective columns.

The third opening/closing unit group 108 includes a plurality of third opening/closing units provided for the respective columns. The third opening/closing units open/close the connection between the second accumulation units and the first horizontal output line 121 or second horizontal output line 122. For example, the third opening/closing units set the second accumulation units and the first horizontal output line 121 or second horizontal output line 122 in a closing state, thereby electrically connecting the second accumulation units to the first horizontal output line 121 or second horizontal output line 122.

The horizontal scanning circuit (HSR) 102 sequentially activates a horizontal scanning signal (HSR) to be supplied to the arrangement of each column in the readout circuit, thereby sequentially closing the third opening/closing unit of each column. With this operation, the horizontal scanning circuit (HSR) 102 cause the third opening/closing unit group 108 to read out signals from (the second accumulation units of) each column of the readout circuit 110 and to output the signals to the output unit 120 via the first horizontal output line 121 and second horizontal output line 122.

Each of the first horizontal output line 121 and second horizontal output line 122 connects (the second accumulation units of) the readout circuit 110 to the output unit 120.

The output unit 120 outputs an image signal in accordance with signals output from the readout circuit 110 via the first horizontal output line 121 and second horizontal output line 122. That is, the output unit 120 outputs an image signal based on the signals held by the second accumulation units. The signals held by the second accumulation units are read out to the output unit 120 by capacitive division between the capacitance of the second accumulation unit and that of the first horizontal output line 121 or the second horizontal output line 122.

Figure 2:
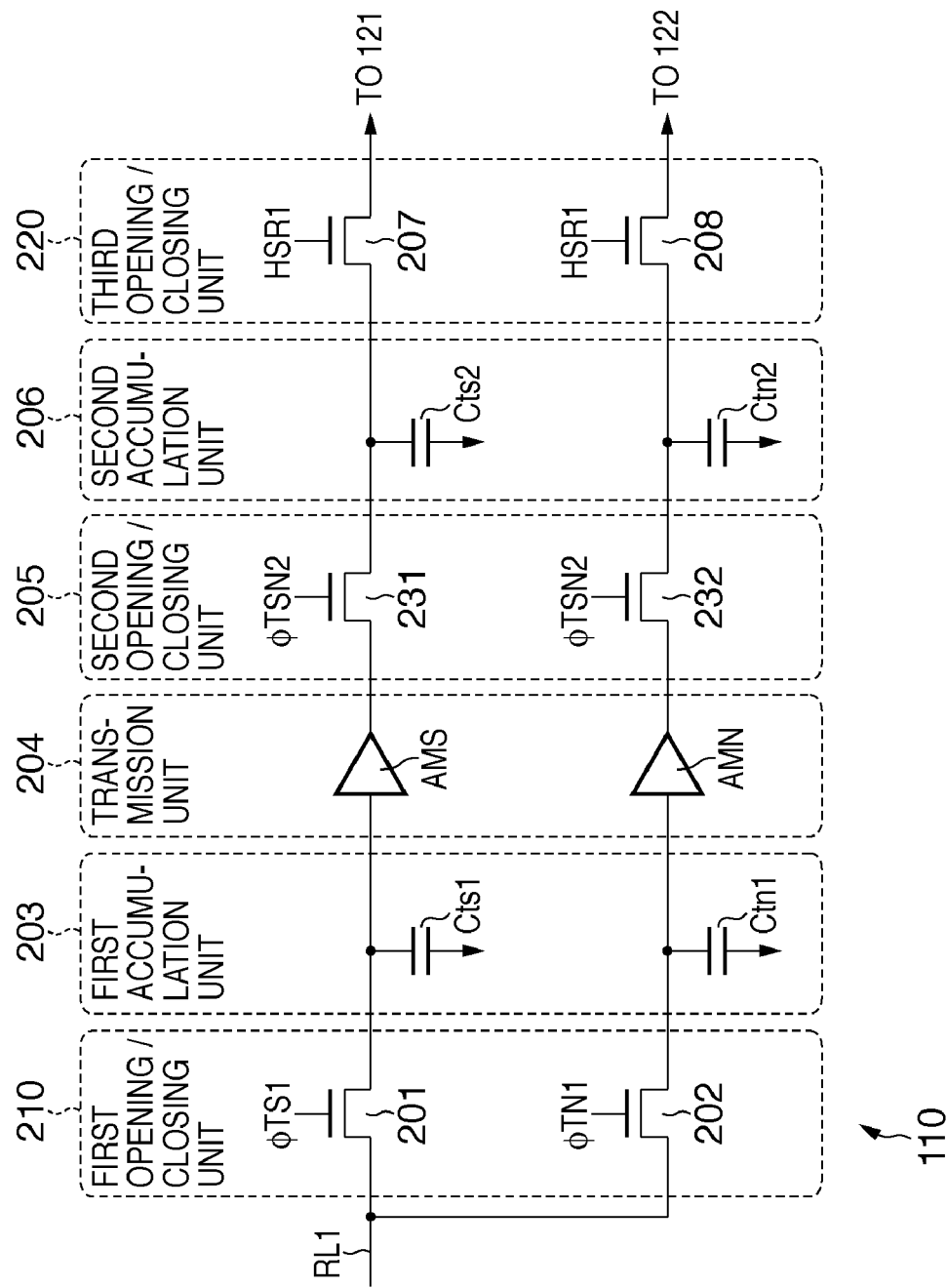
FIG. 2 is a circuit diagram showing the circuit arrangement of one column in a readout circuit.

The arrangement of the readout circuit 110 will be described next with reference to FIG. 2. FIG. 2 is a circuit diagram showing the circuit arrangement of one column in the readout circuit 110. Circuits connected to the column signal line RL1 will mainly be described. This also applies to circuits connected to the remaining column signal lines RL2 to RL4.

For example, the first pixel A11 and the second pixel B11 (FIG. 1) are connected to the upstream side of the column signal line RL1. A first opening/closing unit 210, first accumulation unit 203, transmission unit 204, second opening/closing unit 205, second accumulation unit 206, and third opening/closing unit 220 are connected to the downstream side of the column signal line RL1 in this order. The first horizontal output line 121 and second horizontal output line 122 (FIG. 1) are connected to the succeeding stage of the third opening/closing unit 220.

The first opening/closing unit 210 includes an optical signal switch 201 and a noise signal switch 202. The first accumulation unit 203 includes an optical signal accumulation unit (i.e. first accumulation unit for optical signal) Cts1 and a noise signal accumulation unit (i.e. first accumulation unit for noise signal) Ctn1. The transmission unit 204 includes an optical signal buffer amplifier AMS and a noise signal buffer amplifier AMN, which are impedance converters. The second opening/closing unit 205 includes an optical signal switch 231 and a noise signal switch 232. The second accumulation unit 206 includes an optical signal accumulation unit (i.e. second accumulation unit for optical signal) Cts2 and a noise signal accumulation unit (i.e. second accumulation unit for noise signal) Ctn2. The third opening/closing unit 220 includes an optical signal switch 207 and a noise signal switch 208.

In the circuit arrangement of one column shown in FIG. 2, each switch 201 or the like may include either an NMOS transistor or a PMOS transistor.

Figure 3:
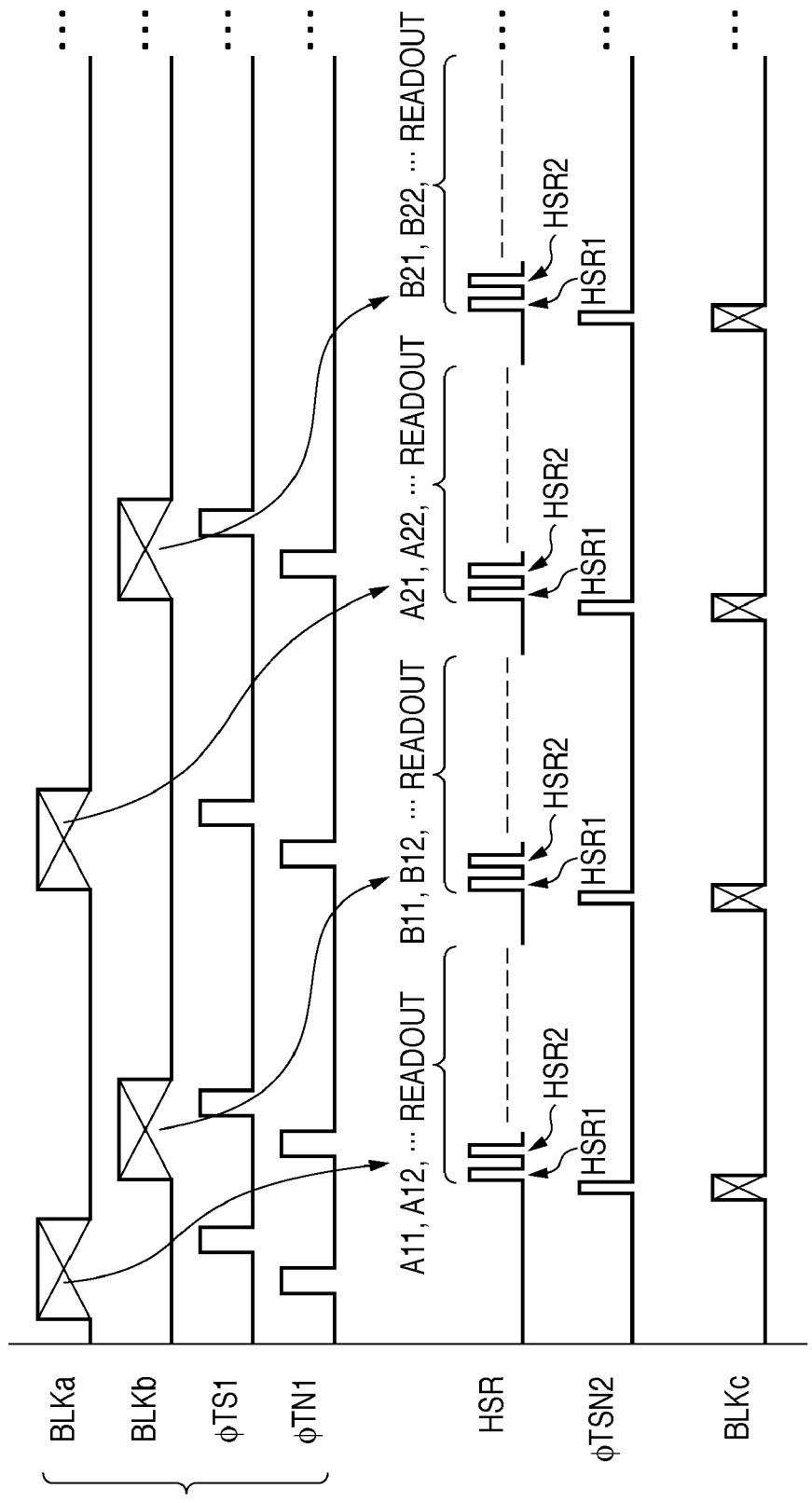
FIG. 3 is a timing chart showing the operation of the readout circuit.

The operation of the readout circuit 110 will be described next. FIG. 3 is a timing chart showing the operation of the readout circuit 110. All signals depicted in FIG. 3 are active at high level. It should be noted that the case where the signal are active at low level can be provided by inverting all the signal logic levels. In FIG. 3, signals φTS1, φTN1, and φTSN2 are supplied from the vertical scanning circuit (VSR) 101 to the readout circuit 110. A signal HSR is supplied from the horizontal scanning circuit (HSR) 102 to the readout circuit 110.

During a period BLKa (i.e. second period), while φTN1 is activated, the switch 202 is turned on so that the noise signal accumulation unit Ctn1 accumulates the noise signal output from the first pixel A11 to the column signal line RL1. While φTS1 is activated, the switch 201 is turned on so that the optical signal accumulation unit Cts1 accumulates the optical signal output from the first pixel A11 to the column signal line RL1. That is, the first accumulation unit 203 accumulates the signal output from the first pixel A11 to the column signal line RL1.

During a period BLKc (i.e. first period), while φTSN2 is activated, the switches 231 and 232 are turned on. The optical signal buffer amplifier AMS reads out the optical signal of the first pixel A11 from the optical signal accumulation unit Cts1 and transmits it to the optical signal accumulation unit Cts2. The noise signal buffer amplifier AMN reads out the noise signal of the first pixel A11 from the noise signal accumulation unit Ctn1 and transmits it to the noise signal accumulation unit Ctn2. That is, the transmission unit 204 reads out the signal of the first pixel A11 from the first accumulation unit 203 and transmits it to the second accumulation unit 206.

During a period BLKb (i.e. second period) following the period BLKc (i.e. first period), while φTN1 is activated, the switch 202 is turned on so that the noise signal accumulation unit Ctn1 accumulates the noise signal output from the second pixel B11 to the column signal line RL1. While φTS1 is activated, the switch 201 is turned on so that the optical signal accumulation unit Cts1 accumulates the optical signal output from the second pixel B11 to the column signal line RL1. That is, the first accumulation unit 203 accumulates the signal output from the second pixel B11 to the column signal line RL1.

During the period BLKb (i.e. second period), while a signal HSR1 for the column signal line RL1 in the horizontal scanning signal HSR is activated, the switches 207 and 208 are turned on to read out the signal of the first pixel A11 from the second accumulation unit 206. More specifically, the optical signal of the first pixel A11 is read out from the optical signal accumulation unit Cts2 to the first horizontal output line 121 by capacitive division between the capacitance of the optical signal accumulation unit Cts2 and that of the first horizontal output line 121. Hence, the optical signal of the first pixel A11 is transmitted to the output unit 120 via the first horizontal output line 121. The noise signal of the first pixel A11 is read out from the noise signal accumulation unit Ctn2 to the second horizontal output line 122 by capacitive division between the capacitance of the noise signal accumulation unit Ctn2 and that of the second horizontal output line 122. Hence, the noise signal of the first pixel A11 is transmitted to the output unit 120 via the second horizontal output line 122. The output unit 120 calculates the difference between the optical signal transmitted via the first horizontal output line 121 and the noise signal transmitted via the second horizontal output line 122 and outputs the differential signal between them to the succeeding stage as an image signal.

The above-described operation is repeated.

It should be noted that, although the operation of the readout circuit 110 is described about the column signal line RL1 except the horizontal scanning signal HSR, the operations of the readout circuit 110 about the remaining column signal lines RL2 to RL4 are the same as in FIG. 3. In the horizontal scanning signal HSR, signals HSR2 to HSR4 for the remaining column signal lines RL2 to RL4 (FIG. 1) are sequentially activated after the active period of the signal HSR1 for the column signal line RL1.

The period BLKc in which the signal held by the first accumulation unit 203 is transmitted to the second accumulation unit 206 is shorter than the period BLKa in which the signal of the first pixel A11 is read out to the first accumulation unit 203. The period BLKc in which the signal held by the first accumulation unit 203 is transmitted to the second accumulation unit 206 is shorter than the period BLKb in which the signal of the second pixel B11 is read out to the first accumulation unit 203. This is because the area of the readout circuit 110 is smaller than the area of the pixel array PA (e.g., an area having a side of several mm to several ten mm long). That is, the time necessary for transmitting a signal through the area of the readout circuit 110 is shorter than the time necessary for transmitting a signal through the area of the pixel array PA.

The capacitance (electrode area) of the first accumulation unit 203 can be smaller than that of the second accumulation unit 206. The reason is as follows.

In the technique disclosed in Japanese Patent Laid-Open No. 2001-45378, one of the two accumulation units connected to each of the plurality of column signal lines must have the same capacitance (electrode area) as that of the other accumulation unit to equalize the gain for readout, as described above. When a signal is read out from each of the two accumulation units to the horizontal output line, the readout gain is determined in accordance with the capacitive division ratio between the capacitance of the accumulation unit and the capacitance of the horizontal output line. To prevent the readout gain from being too low, both the two accumulation units must have a large capacitance (electrode area). As a result, the chip area increases, and the chip yield inevitably decreases.

In this embodiment, however, the transmission unit 204 including the optical signal buffer amplifier AMS and noise signal buffer amplifier AMN is provided between the first accumulation unit 203 and the second accumulation unit 206. The transmission unit 204 supplies a signal corresponding to electric charges held by the first accumulation unit 203 to the second accumulation unit 206, instead of directly supplying the electric charges held by the first accumulation unit 203 themselves to the second accumulation unit 206. This prevents the capacitance of the first accumulation unit 203 from influencing the capacitive division between the capacitance of the second accumulation unit 206 and that of the first horizontal output line 121 or second horizontal output line 122 in reading out a signal to the output unit 120 by the capacitive division. This is because even when the first accumulation unit 203 has a capacitance smaller than that of the second accumulation unit 206, the performance in which the signal readout from the first accumulation unit 203 to the second accumulation unit 206 does not use capacitive division. It is consequently possible to read out high-quality image data at a high speed while improving the gain and S/N ratio without increasing the chip area and decreasing the chip yield. That is, according to this embodiment, it is possible to reduce image quality degradation and decrease the chip area even in reading out a pixel signal at a high speed.

In the technique of Japanese Patent Laid-Open No. 11-150255, two accumulation units and two amplifiers are alternately connected, in correspondence with one signal, to each of a plurality of column signal lines. A signal accumulated in one of the two accumulation units is amplified by one of the two amplifiers and then accumulated in the other accumulation unit. The signal accumulated in the other accumulation unit is amplified by the other amplifier and read out to the output line of the succeeding stage, as described above. In this case, the performance in which the signal readout from the two accumulation units does not use capacitive division. It is therefore possible to read out the signal without decreasing the gain independently of the capacitances of the two accumulation units. However, since two amplifiers are connected to each of the plurality of column signal lines, the chip area of the image sensing apparatus may increase. In addition, since two amplifiers operate for reading out one signal, the entire power consumption in the entire readout period in the image sensing apparatus may increase.

In this embodiment, however, only one amplifier is connected, for one signal, to each of the plurality of column signal lines. For this reason, the chip area of the image sensing apparatus can be reduced. In addition, only one amplifier operates for reading out one signal (i.e. a optical signal or a noise signal). For this reason, the power consumption in the image sensing apparatus can be suppressed, as compared to the technique of Japanese Patent Laid-Open No. 11-150255. That is, it is possible to reduce the chip area and suppress an increase in power consumption even in reading out a pixel signal at a high speed.

Figure 4:
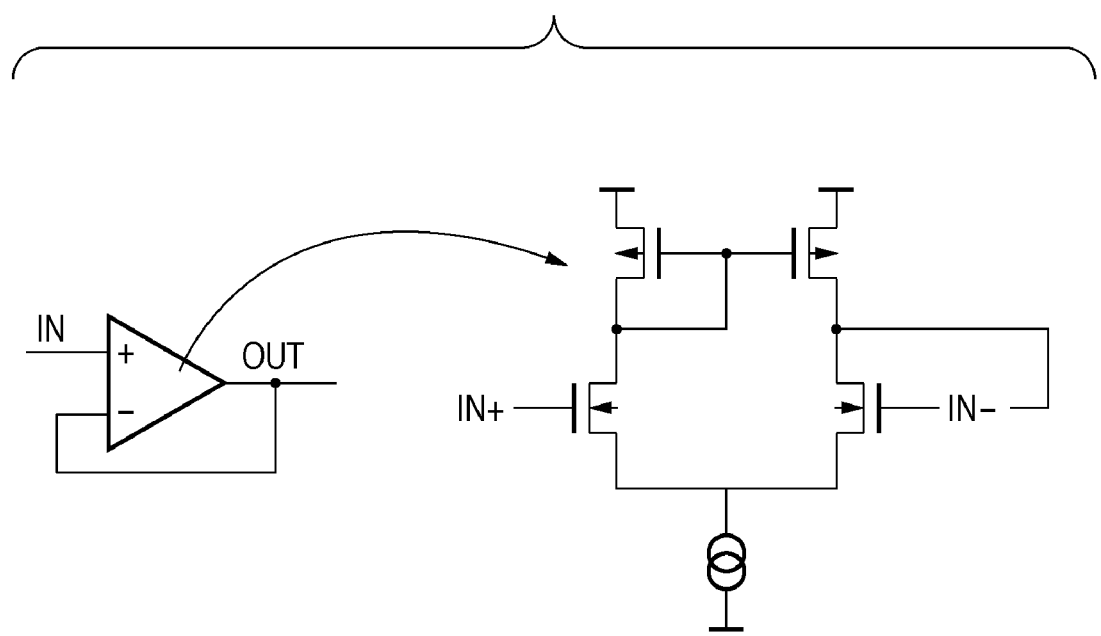
FIG. 4 is a circuit diagram showing the circuit arrangement of a transmission unit.

The buffer amplifiers AMS and AMN of the transmission unit 204 may be designed to apply a gain. Alternatively, a buffer whose gain is 1 may simply be used only to avoid any decrease in the gain by the capacitive division ratio between the first accumulation unit 203 and the second accumulation unit 206. FIG. 4 shows an example of a buffer amplifier serving as a voltage follower whose gain is 1.

Figure 5:
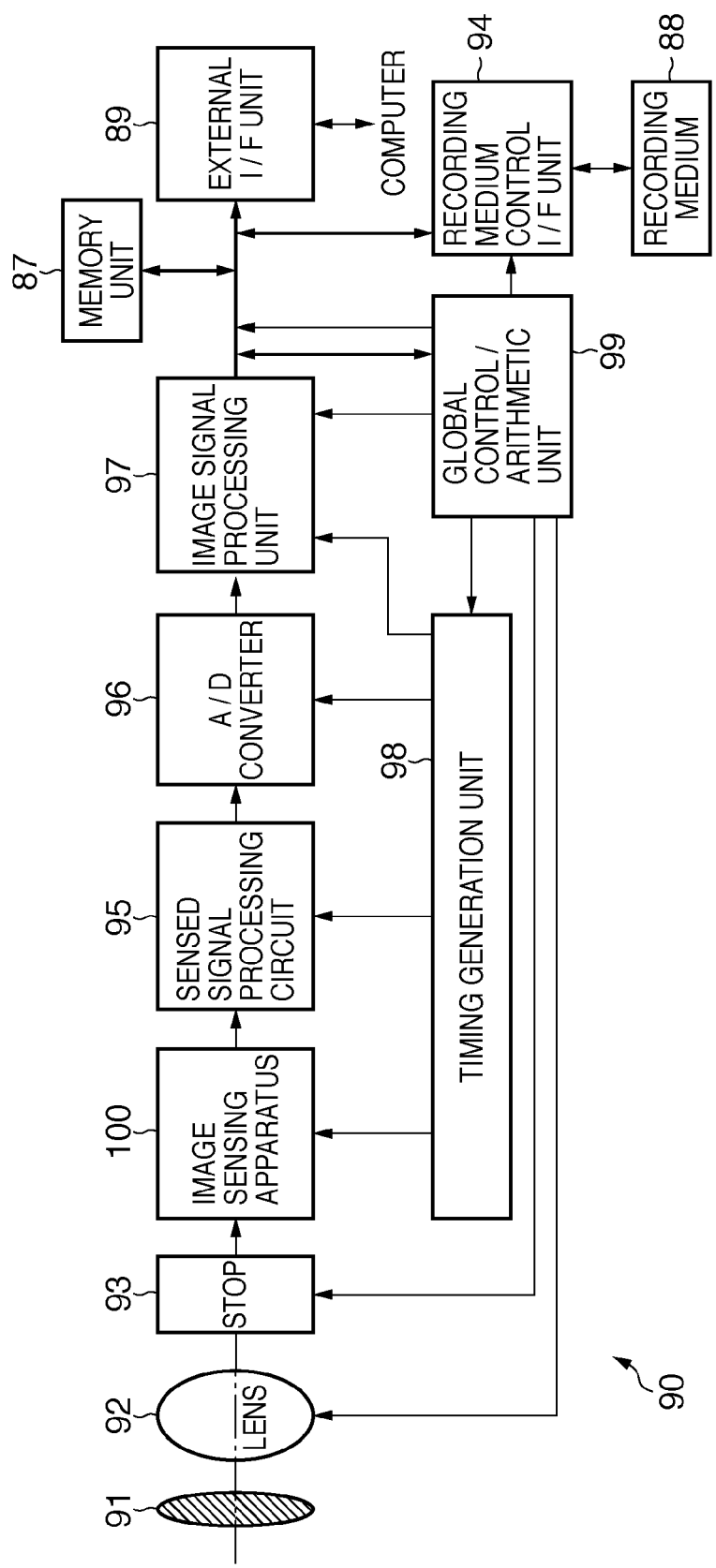
FIG. 5 is a block diagram showing the arrangement of an imaging system using the image sensing apparatus according to the first embodiment.

FIG. 5 shows an example of an imaging system using the image sensing apparatus 100 of the present invention.

An imaging system 90 mainly includes an optical system, the image sensing apparatus 100, and a signal processing unit, as shown in FIG. 5. The optical system mainly includes a shutter 91, lens 92, and stop 93. The signal processing unit mainly includes a sensed signal processing circuit 95, A/D converter 96, image signal processing unit 97, memory unit 87, external I/F unit 89, timing generation unit 98, global control/arithmetic unit 99, recording medium 88, and recording medium control I/F unit 94. The signal processing unit need not always include the recording medium 88.

The shutter 91 is located in front of the lens 92 on the optical path to control exposure.

The lens 92 refracts incident light and forms an object image on the imaging plane (pixel array PA) of the image sensing apparatus 100.

The stop 93 is provided on the optical path between the lens 92 and the image sensing apparatus 100 to adjust the amount of light which passes through the lens 92 and is guided to the image sensing apparatus 100.

The image sensing apparatus 100 converts the object image formed on the imaging plane (pixel array PA) into an image signal. The image sensing apparatus 100 reads out the image signal from the pixel array PA and outputs it.

The sensed signal processing circuit 95 is connected to the image sensing apparatus 100 to process the image signal output from the image sensing apparatus 100.

The A/D converter 96 is connected to the sensed signal processing circuit 95 to convert the processed image signal (analog signal) output from the sensed signal processing circuit 95 into an image signal (digital signal).

The image signal processing unit 97 is connected to the A/D converter 96 to perform arithmetic processes such as various kinds of correction for the image signal (digital signal) output from the A/D converter 96, thereby generating image data. The image data is supplied to the memory unit 87, external I/F unit 89, global control/arithmetic unit 99, and recording medium control I/F unit 94.

The memory unit 87 is connected to the image signal processing unit 97 to store the image data output from the image signal processing unit 97.

The external I/F unit 89 is connected to the image signal processing unit 97 so that the image data output from the image signal processing unit 97 is transferred to an external device (e.g., personal computer) via the external I/F unit 89.

The timing generation unit 98 is connected to the image sensing apparatus 100, sensed signal processing circuit 95, A/D converter 96, and image signal processing unit 97 to supply a timing signal to them. The image sensing apparatus 100, sensed signal processing circuit 95, A/D converter 96, and image signal processing unit 97 operate in synchronism with the timing signal.

The global control/arithmetic unit 99 is connected to the timing generation unit 98, image signal processing unit 97, and recording medium control I/F unit 94 to comprehensively control them.

The recording medium 88 is detachably connected to the recording medium control I/F unit 94. The image data output from the image signal processing unit 97 is recorded on the recording medium 88 via the recording medium control I/F unit 94.

With the above arrangement, when the image sensing apparatus 100 can obtain a good image signal, a good image (image data) can be obtained.

Figure 6:
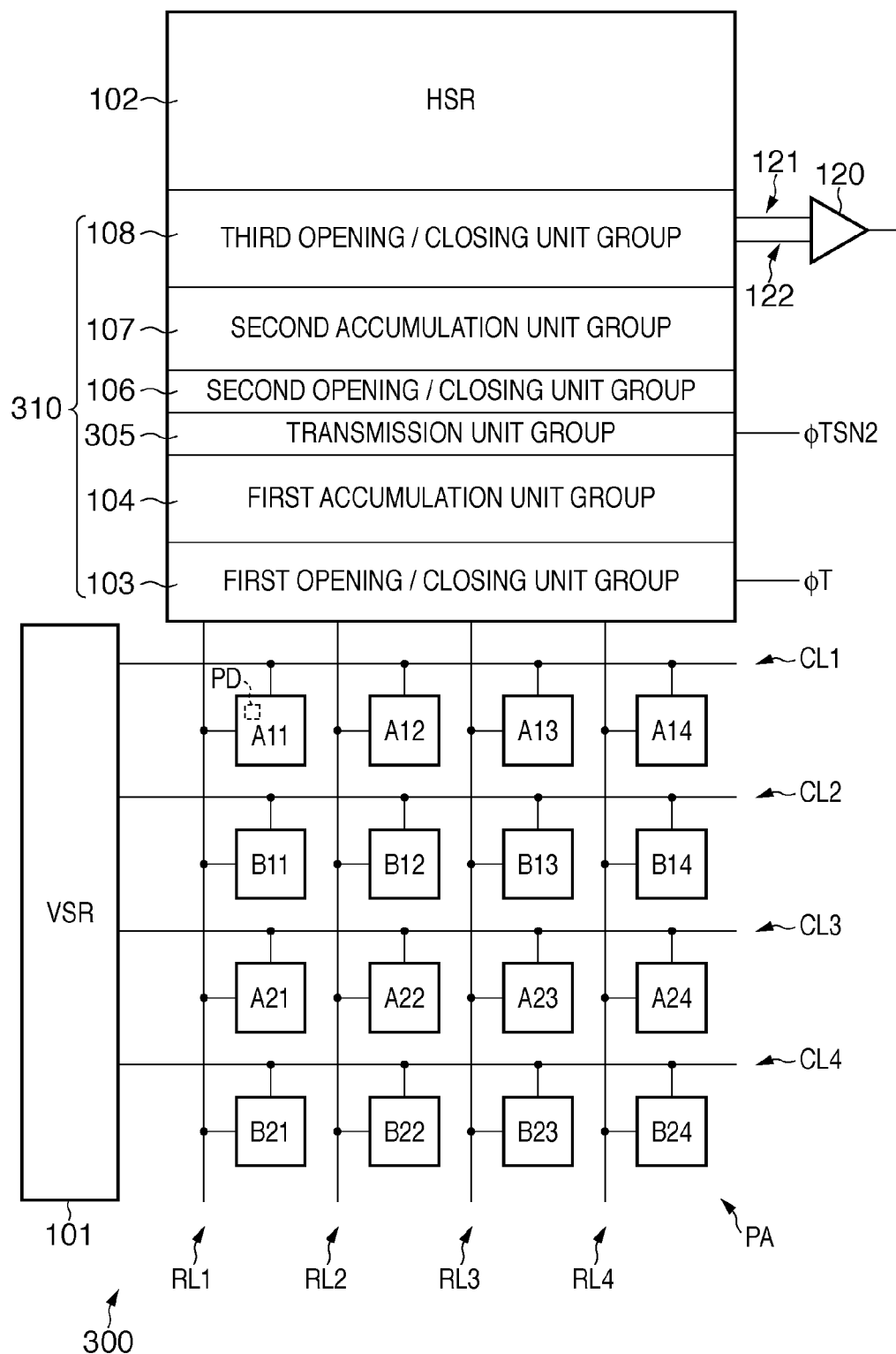
FIG. 6 is a view showing the arrangement of an image sensing apparatus 300 according to the second embodiment of the present invention.
Figure 7:
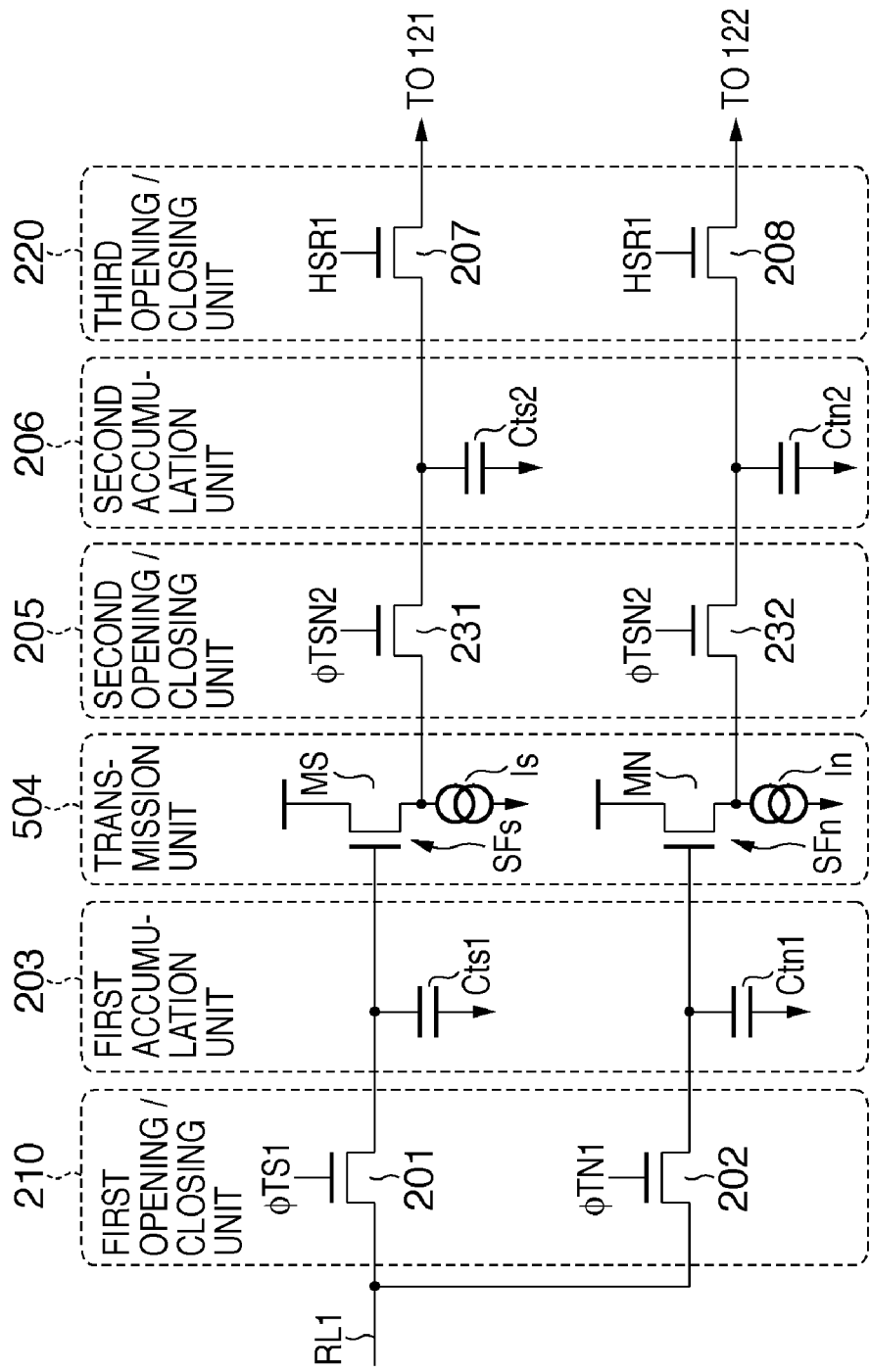
FIG. 7 is a circuit diagram showing the circuit arrangement of one column in a readout circuit.

An image sensing apparatus 300 according to the second embodiment of the present invention will be described next with reference to FIGS. 6 and 7. FIG. 6 is a view showing the arrangement of the image sensing apparatus 300 according to the second embodiment of the present invention. FIG. 7 is a circuit diagram showing the circuit arrangement of one column in a readout circuit. Portions different from the first embodiment will mainly be described below, and a description of the same portions will be omitted.

The image sensing apparatus 300 has the same basic arrangement as in the first embodiment except for a readout circuit 310. The readout circuit 310 is different from the first embodiment in that it includes a transmission unit group 305.

As shown in FIG. 7, a transmission unit 504 of each column included in the transmission unit group 305 includes an optical signal source follower SFs and a noise signal source follower SFn. The optical signal source follower SFs includes an NMOS transistor MS and a constant current source Is. The noise signal source follower SFn includes an NMOS transistor MN and a constant current source In.

The MOS transistor MS receives, via the gate, a signal held by an optical signal accumulation unit Cts1 of a first accumulation unit 203 and outputs, via the source, a signal corresponding to the signal input to the gate to an optical signal accumulation unit Cts2 of a second accumulation unit 206.

The MOS transistor MN receives, via the gate, a signal held by a noise signal accumulation unit Ctn1 of the first accumulation unit 203 and outputs, via the source, a signal corresponding to the signal input to the gate to a noise signal accumulation unit Ctn2 of the second accumulation unit 206.

The transmission unit 504 including the optical signal source follower SFs and noise signal source follower SFn can raise the input impedance and lower the output impedance by the simple arrangement. The transmission unit 504 supplies a signal corresponding to electric charges held by the first accumulation unit 203 to the second accumulation unit 206, instead of directly supplying the electric charges held by the first accumulation unit 203 themselves to the second accumulation unit 206, as in the first embodiment.

Each of the optical signal source follower SFs and noise signal source follower SFn of the transmission unit 504 may include a PMOS transistor in place of the NMOS transistor (MOS transistor MS or MN).

Figure 8:
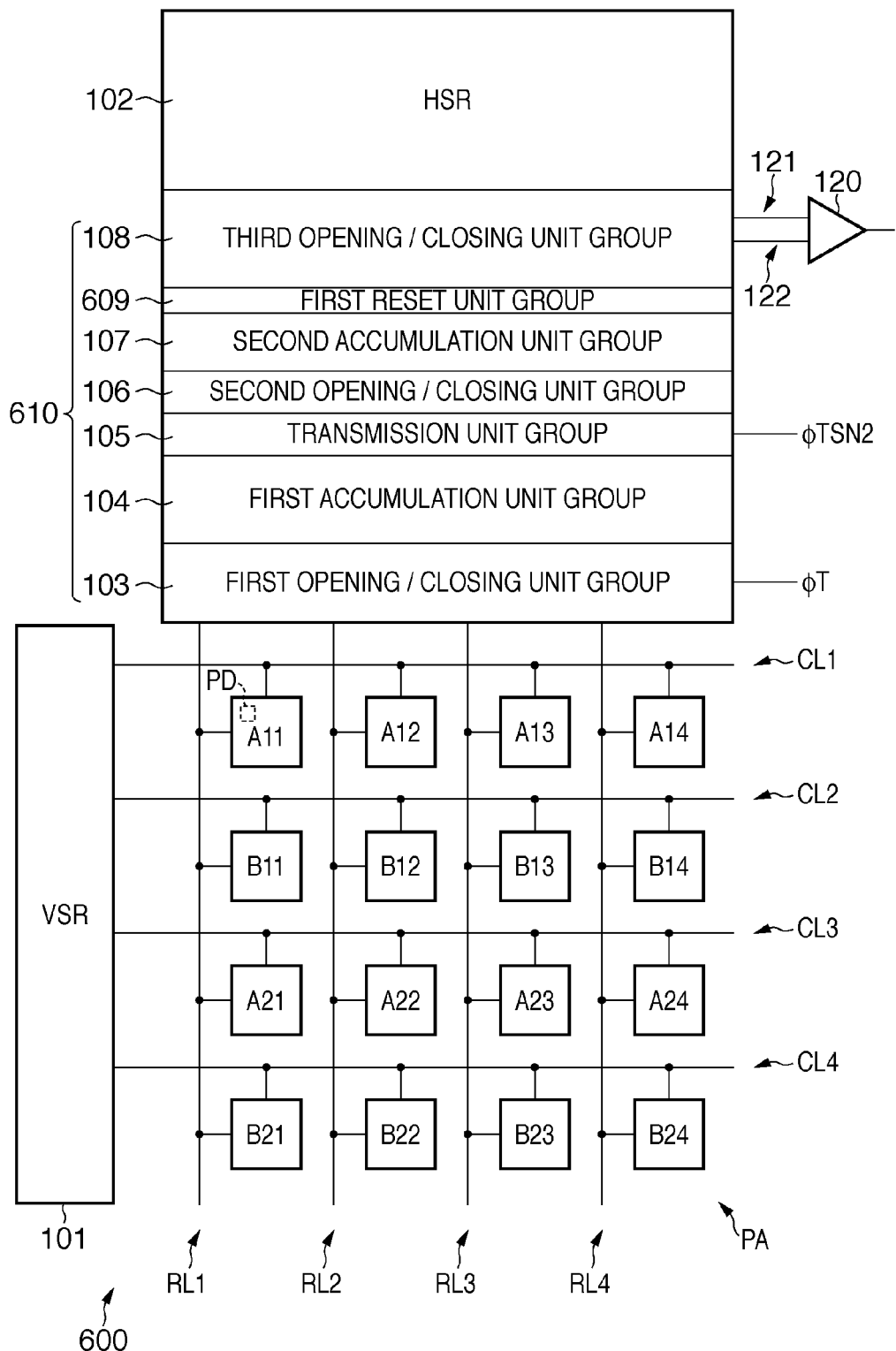
FIG. 8 is a view showing the arrangement of an image sensing apparatus 600 according to the third embodiment of the present invention.
Figure 9:
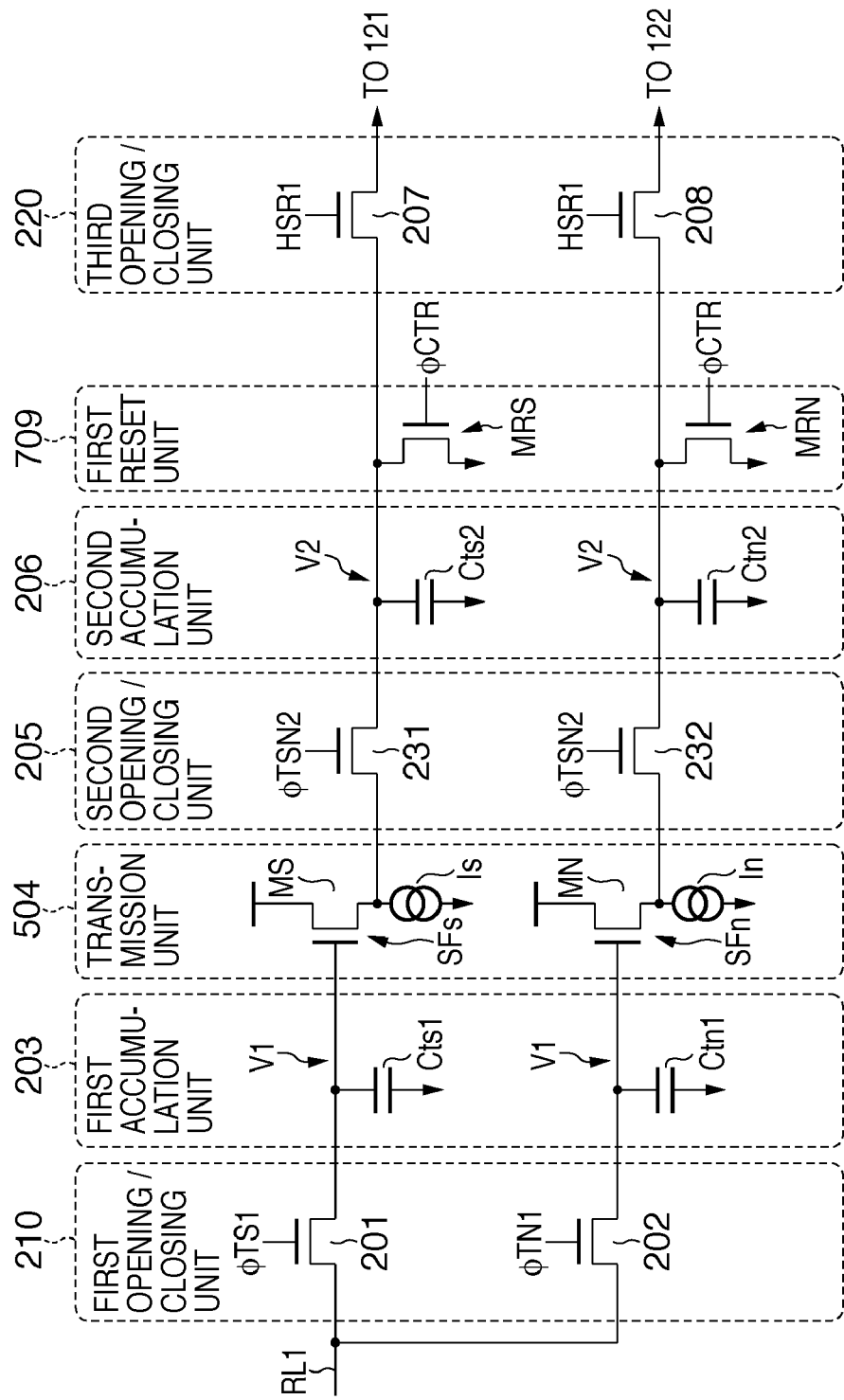
FIG. 9 is a circuit diagram showing the circuit arrangement of one column in a readout circuit.
Figure 10:
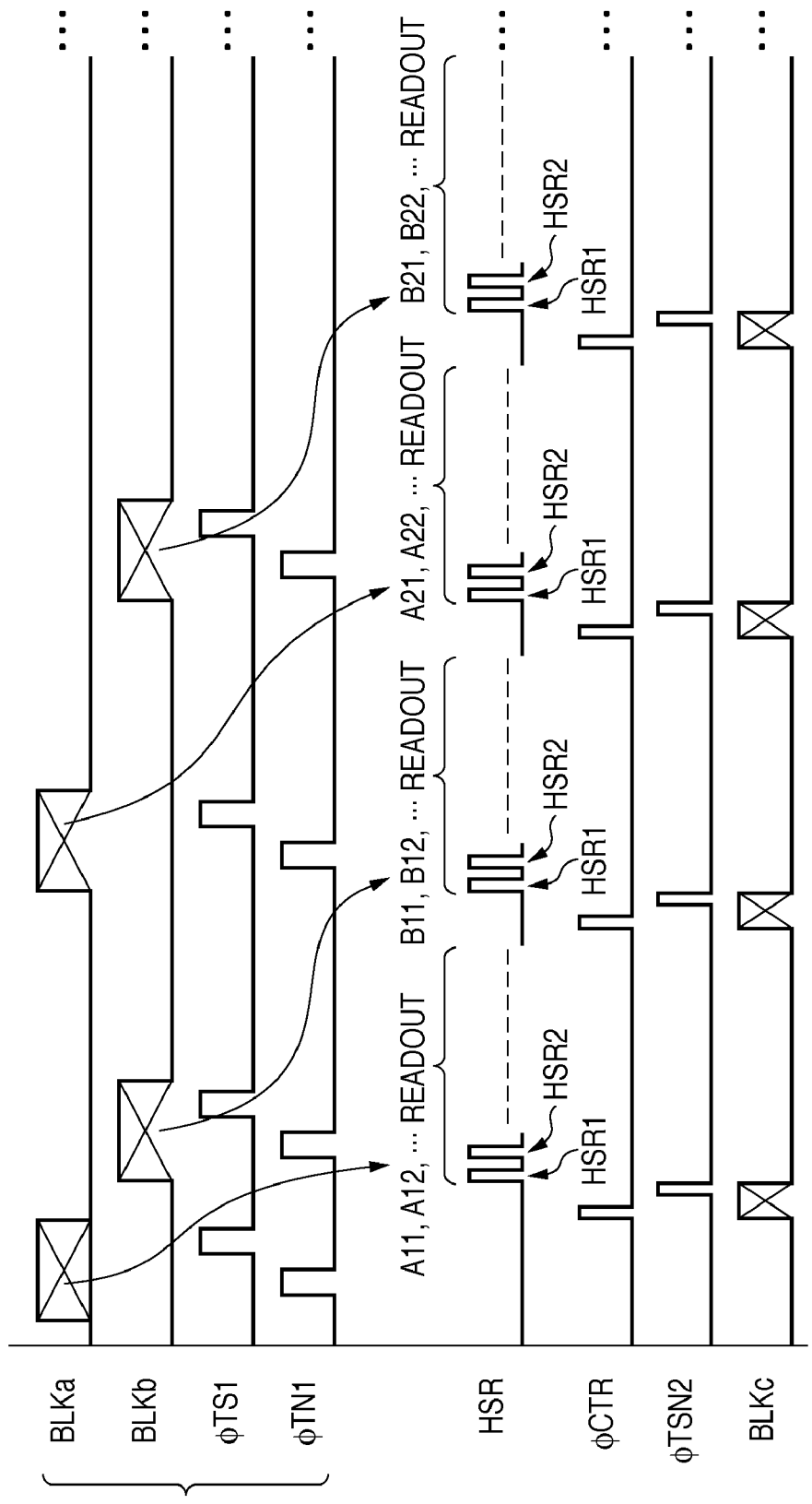
FIG. 10 is a timing chart showing the operation of the readout circuit.

An image sensing apparatus 600 according to the third embodiment of the present invention will be described next with reference to FIGS. 8 to 11. FIG. 8 is a view showing the arrangement of the image sensing apparatus 600 according to the third embodiment of the present invention. FIG. 9 is a circuit diagram showing the circuit arrangement of one column in a readout circuit. FIG. 10 is a timing chart showing the operation of the readout circuit. FIG. 11 is a view for explaining a reset potential. Portions different from the first and second embodiments will mainly be described below, and a description of the same portions will be omitted.

The image sensing apparatus 600 has the same basic arrangement as in the first and second embodiments except for a readout circuit 610. The readout circuit 610 is different from the first and second embodiments in that it includes a first reset unit group 609 between a second accumulation unit group 107 and a third opening/closing unit group 108.

A first reset unit 709 of each column included in the first reset unit group 609 is provided between the second accumulation unit 206 and the third opening/closing unit 220, as shown in FIG. 9. The first reset unit 709 includes an optical signal reset transistor MRS and a noise signal reset transistor MRN. The optical signal reset transistor MRS resets a potential V2 of an optical signal accumulation unit Cts2. The noise signal reset transistor MRN resets the potential V2 of a noise signal accumulation unit Ctn2. That is, the first reset unit 709 resets the potential V2 of the second accumulation unit 206.

The first reset unit 709 can be provided anywhere except at the position between the second accumulation unit 206 and the third opening/closing unit 220 if it can reset the potential V2 of the second accumulation unit 206.

The operation of the readout circuit is different from the first and second embodiments in the following points, as shown in FIG. 10.

During a period BLKC (i.e. first period), while φCTR is activated, the optical signal reset transistor MRS and noise signal reset transistor MRN of the first reset unit 709 are turned on. At this time, a second opening/closing unit 205 is OFF. Hence, the first reset unit 709 resets the potential V2 of the second accumulation unit 206 which is electrically disconnected from a transmission unit 504. More specifically, let V1 be the potential of a first accumulation unit 203, Vthn be the threshold voltage of NMOS transistors MS and MN, and V2 be the potential of the second accumulation unit 206. At this time, the first reset unit 709 resets the potential V2 of the second accumulation unit 206 to satisfy $$V2 \leq V1 - Vthn \tag{1}$$

While φTSN2 is activated, switches 231 and 232 are turned on to electrically connect the NMOS transistor MS of an optical signal source follower SFs and the NMOS transistor MN of a noise signal source follower SFn to the second accumulation unit 206. At this time, the NMOS transistor MS raises the potential V2 of the optical signal accumulation unit Cts2 from the potential (equation (1)) reset by the first reset unit 709 to a potential corresponding to the signal held by an optical signal accumulation unit Cts1. The NMOS transistor MN raises the potential V2 of the noise signal accumulation unit Ctn2 from the potential (equation (1)) reset by the first reset unit 709 to a potential corresponding to the signal held by a noise signal accumulation unit Ctn1. That is, when electrically connected to the second accumulation unit 206, the NMOS transistors MS and MN raise the potential V2 of the second accumulation unit 206 from the potential reset by the first reset unit 709 to a potential corresponding to the signal held by the first accumulation unit 203.

The reason why the first reset unit 709 should reset the potential V2 of the second accumulation unit 206 to the potential represented by equation (1) will be explained with reference to FIG. 11. Consider a circuit formed by connecting a source follower SF including an NMOS transistor NM and a constant current source Ic to a capacitive load CL via a switch SW. Let Vg be the gate potential, Vd be the drain potential, Vs be the source potential, Vth be the threshold voltage, and Id be the drain current of the NMOS transistor NM. Let Ib be a predetermined current value Ib supplied from the constant current source Ic, and VCL be the potential of the capacitive load CL.

The operation changes depending on the initial value of the potential VCL of the capacitive load CL before a timing Ton at which the signal φTSN2 for turning on the switch SW is activated. The potential VCL of the capacitive load CL corresponds to the potential V2 of the second accumulation unit 206. The potential Vg corresponds to the potential V1 of the first accumulation unit 203. The potential VCL of the capacitive load CL is determined by the difference between the current value Ib of the constant current source Ic and the drain current Id of the NMOS transistor NM. If $$VCL \leq Vg - Vth \tag{2}$$

before the timing Ton to turn on the switch SW, the NMOS transistor NM of the source follower SF is turned on at the timing Ton so that the drain current Id flows between the drain and source of the NMOS transistor. If the circuit shown in FIG. 11 operates in a pentode, $$Id \propto (Vg - Vth) \tag{3}$$

Hence, the NMOS transistor NM instantaneously charges the capacitive load CL and raises the potential VCL. The NMOS transistor NM changes the source potential Vs (=VCL) to almost (Vg−Vth). After the elapse of time ΔT1 from the timing Ton, the current Id=Ib flows, and a steady state is obtained.

On the other hand, if $$VCL > Vg - Vth \tag{4}$$

before the timing Ton to turn on the switch SW, the switch SW is OFF at the timing Ton. Hence, the drain current Id does not flow between the drain and source. The constant current source Ic removes electric charges from the capacitive load CL in accordance with the current value Ib and lowers the potential VCL of the capacitive load CL at a predetermined ratio per unit time. The constant current source Ic changes the source potential Vs (=VCL) of the NMOS transistor NM to almost (Vg−Vth). After the elapse of time ΔT2 from the timing Ton, the current Id=Ib flows, and a steady state is obtained. In this case, the time to lower the potential VCL of the capacitive load CL can be shortened by increasing the current value Ib of the constant current source Ic. However, since the current value Ib always flows, and the current consumption increases, the quality of the image sensing apparatus is poor. To suppress the current consumption, the current value Ib of the constant current source Ic needs to be small. This produces a tendency of $$\Delta T1 < \Delta T2 \tag{5}$$

as shown in FIG. 11.

Hence, in this embodiment, the first reset unit 709 resets the potential V2 of the second accumulation unit 206 to the potential represented by equation (1) while the second accumulation unit 206 is electrically disconnected from the transmission unit 504. This shortens the period BLKc and reduces the current consumption of the image sensing apparatus 600.

Figure 12:
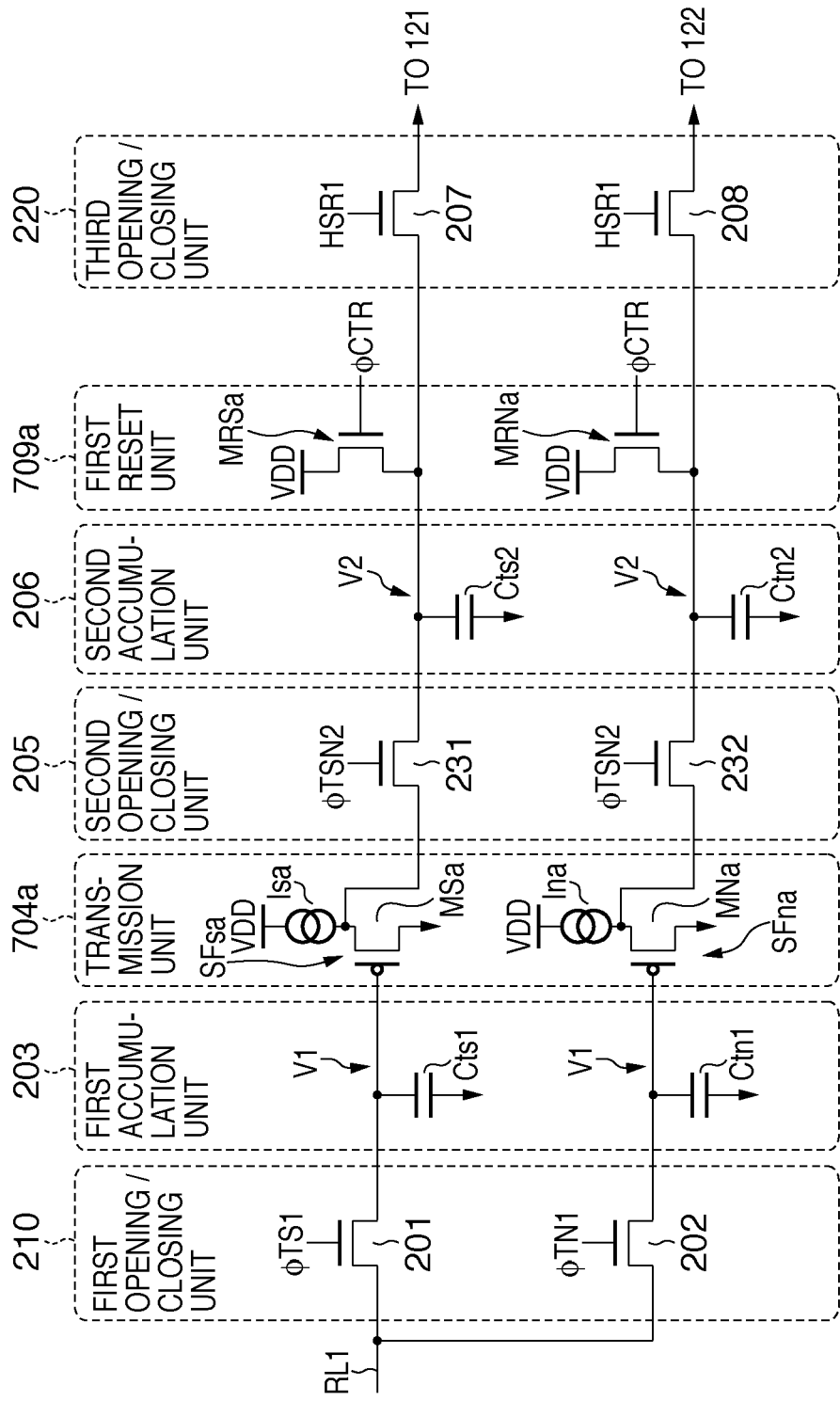
FIG. 12 is a circuit diagram showing the circuit arrangement of one column in a readout circuit (modification)

As shown in FIG. 12, a transmission unit 704a may include an optical signal source follower SFsa and a noise signal source follower SFna. The optical signal source follower SFsa includes a PMOS transistor MSa and a constant current source Isa. The noise signal source follower SFna includes a PMOS transistor MNa and a constant current source Ina. A first reset unit 709a resets the potential V2 of the second accumulation unit 206 which is electrically disconnected from the transmission unit 704a. More specifically, let V1 be the potential of the first accumulation unit 203, Vthp be the threshold voltage of PMOS transistors, and V2 be the potential of the second accumulation unit 206. At this time, the first reset unit 709a resets the potential V2 of the second accumulation unit 206 to satisfy $$V2 \geq V1 + Vthp \tag{6}$$

When electrically connected to the second accumulation unit 206, the PMOS transistors MSa and MNa lower the potential V2 of the second accumulation unit 206 from the potential reset by the first reset unit 709a to a potential corresponding to the signal held by the first accumulation unit 203.

Figure 13:
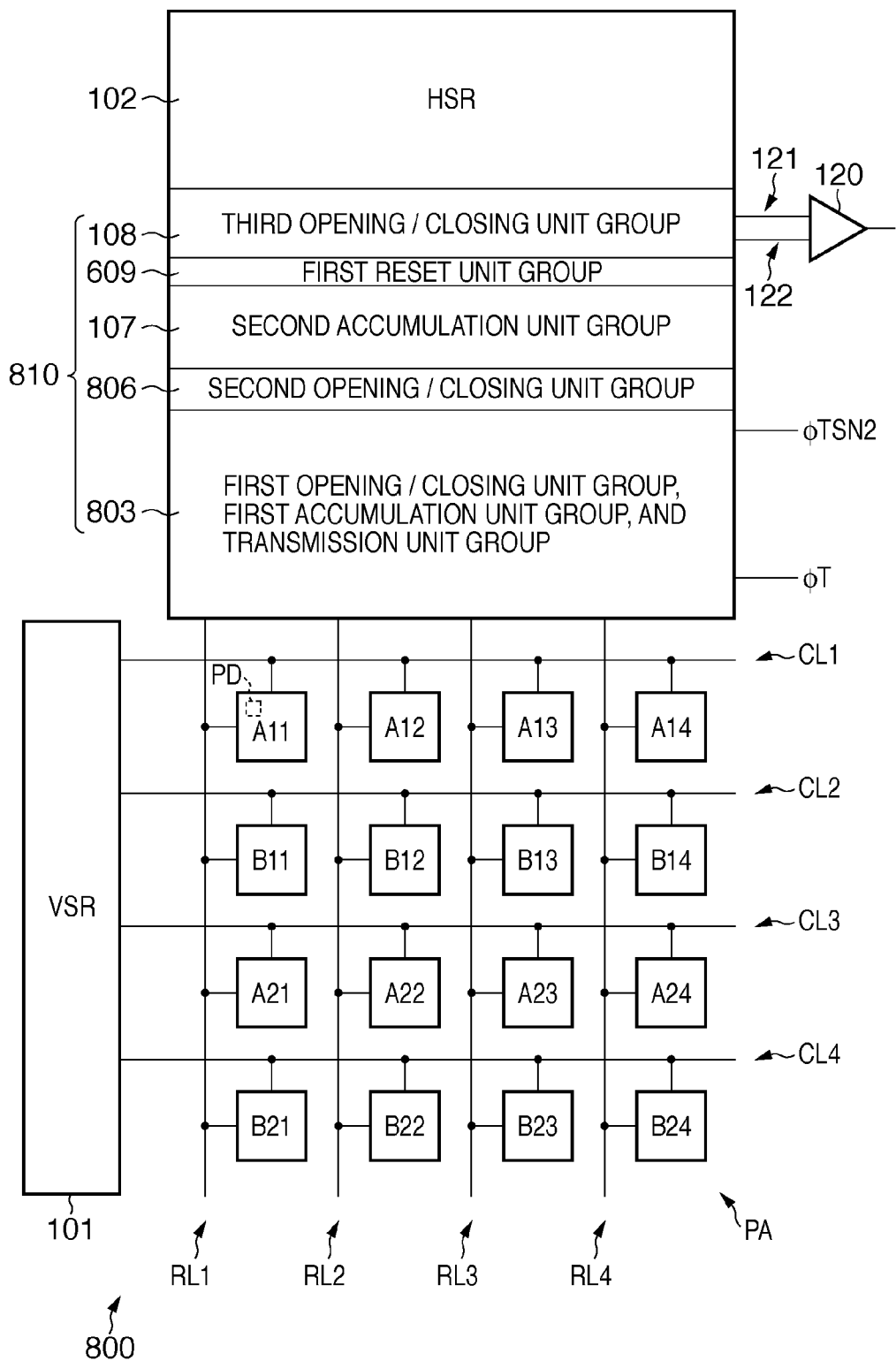
FIG. 13 is a view showing the arrangement of an image sensing apparatus 800 according to the fourth embodiment of the present invention.
Figure 14:
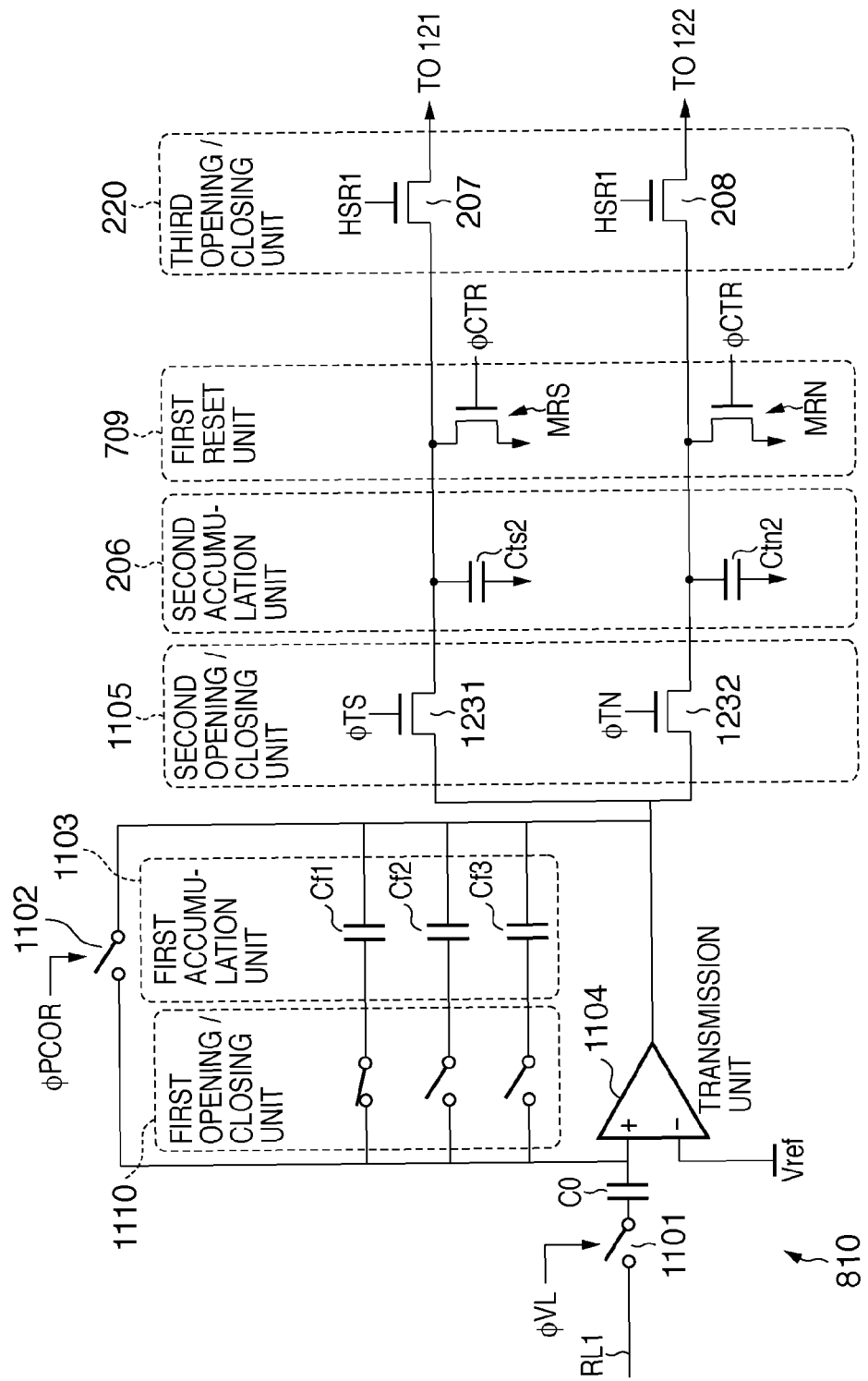
FIG. 14 is a circuit diagram showing the circuit arrangement of one column in a readout circuit.
Figure 15:
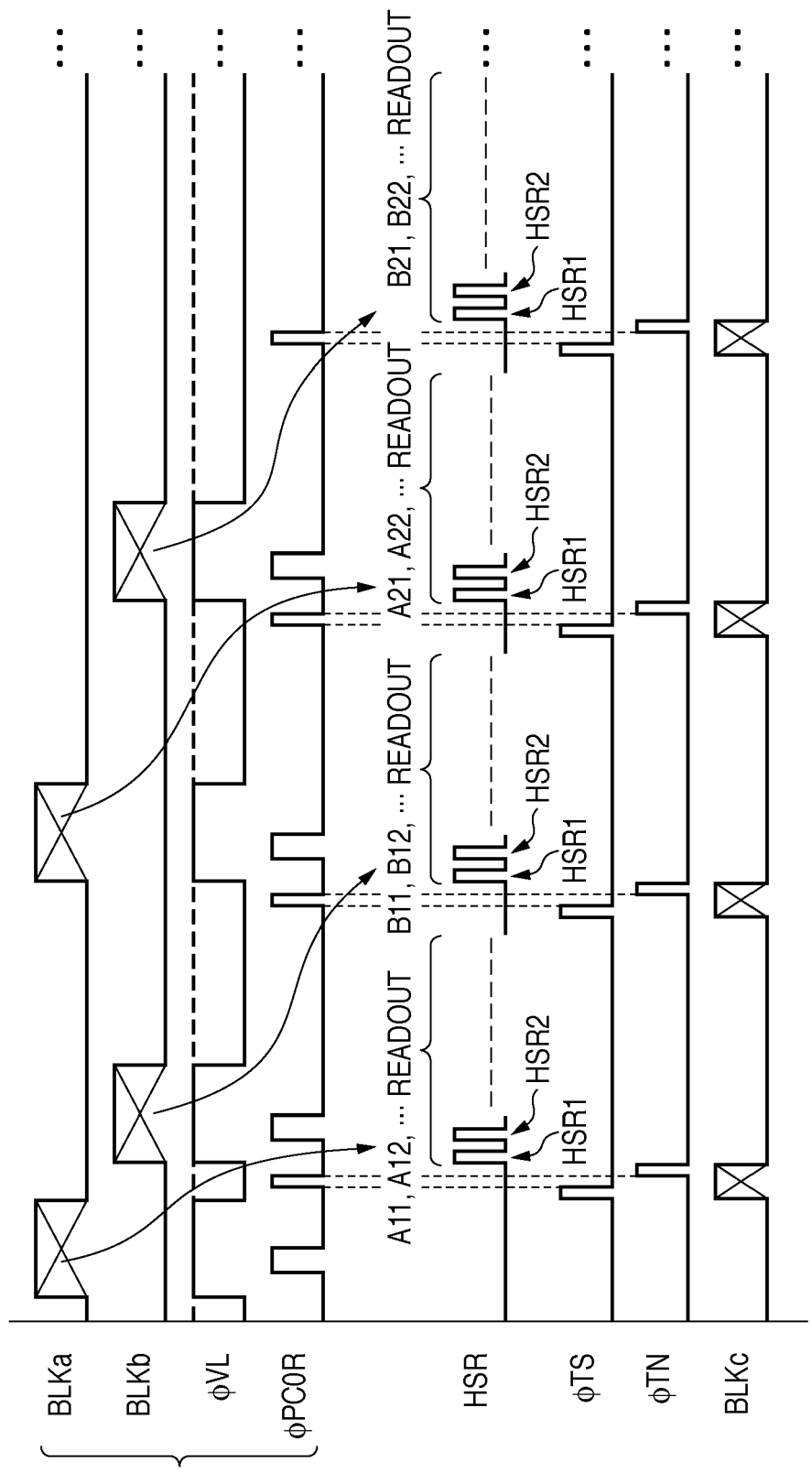
FIG. 15 is a timing chart showing the operation of the readout circuit.

An image sensing apparatus 800 according to the fourth embodiment of the present invention will be described next with reference to FIGS. 13 to 16. FIG. 13 is a view showing the arrangement of the image sensing apparatus 800 according to the fourth embodiment of the present invention. FIG. 14 is a circuit diagram showing the circuit arrangement of one column in a readout circuit. FIG. 15 is a timing chart showing the operation of the readout circuit. Portions different from the first to third embodiments will mainly be described below, and a description of the same portions will be omitted.

The image sensing apparatus 800 has the same basic arrangement as in the first to third embodiments except for a readout circuit 810. The readout circuit 810 is different from the first to third embodiments in that it includes a 'first opening/closing unit group, first accumulation unit group, and transmission unit group' 803, and a second opening/closing unit group 806.

A first opening/closing unit 1110, first accumulation unit 1103, and transmission unit 1104 of each column included in the 'first opening/closing unit group, first accumulation unit group, and transmission unit group' 803 have a circuit arrangement shown in FIG. 14.

More specifically, the first accumulation unit 1103 is connected to the inverting input terminal and output terminal of the transmission unit 1104. A second opening/closing unit 1105 is also connected to the output terminal of the transmission unit 1104. A terminal to supply a reference potential Vref is connected to the inverting input terminal of the transmission unit 1104. With this arrangement, the transmission unit 1104 calculates the difference between the reference signal Vref and a signal based on a signal fed back from the output terminal via the first accumulation unit 1103 and a signal output to a column signal line RL1, and outputs the differential signal. The transmission unit 1104 thus transmits the signal held by the first accumulation unit 1103 to a second accumulation unit 206 via the second opening/closing unit 1105. The transmission unit 1104 supplies a signal corresponding to electric charges held by the first accumulation unit 1103 to the second accumulation unit 206. The second opening/closing unit 1105 opens/closes the connection between the output terminal of the transmission unit 1104 and the second accumulation unit 206 (Cts2, Ctn2).

Referring to FIG. 14, an opening/closing unit 1101 short-circuits or opens the path between the column signal line RL1 and a capacitance C0. An opening/closing unit 1102 short-circuits or opens the feedback path of the transmission unit 1104.

The arrangement of the readout circuit 810 is generally called a column amplifier system which can multiplies a gain corresponding to a ratio C0/Cf. A capacitance Cf (Cf1, Cf2, Cf3) of the first accumulation unit 1103 can change depending on the open/closing state (the number of switches in the ON state) of the first opening/closing unit 1110. It is therefore possible to set the gain in accordance with the application purpose. FIG. 14 shows an example in which Cf1 is selected.

The operation of the readout circuit 810 is different from the first to third embodiments in the following points, as shown in FIG. 15.

During a period BLKa (i.e. second period), a signal φVL is activated to input a noise signal (VN) output from a first pixel A11 to C0 via the column signal line RL1 and opening/closing unit 1101. While a signal φPC0R is activated, the opening/closing unit 1102 is turned on. The two terminals of the capacitance Cf (Cf1, Cf2, Cf3) of the first accumulation unit 1103 are reset to Vref so that held electric charges are discharged to the power supply or GND, and a reset state is obtained. When the signal φPC0R is deactivated, the opening/closing unit 1102 is turned off to input an optical signal (VS+VN) output from the first pixel A11 to C0 via the column signal line RL1 and opening/closing unit 1101. At this time, a signal represented by $$Vout1 = (VS+VN-VN)*Co/Cf + Vref + Voffset \qquad (7)$$

appears at the output terminal of the transmission unit 1104. That is, a Vref-based output appears as Vout1, which is obtained by removing the noise component from the optical signal of the first pixel A11 and multiplying the resultant signal by the gain C0/Cf. Voffset is the offset noise of the transmission unit 1104. Hence, the first accumulation unit 1103 accumulates the signal of the first pixel A11, which is given by $$Vcf = Vout1 - Vref \qquad (8)$$
$$= (VS + VN - VN) * Co/Cf + Voffset$$

During a period BLKc (i.e. first period), while a signal φTS is activated, the signal Vout1 represented by equation (7) is transmitted from the first accumulation unit 1103 to an optical signal accumulation unit Cts2 of the second accumulation unit 206 via a switch 1231. The optical signal accumulation unit Cts2 of the second accumulation unit 206 holds the signal Vout1. While the signal φTS is deactivated, and the signal φPC0R is activated, the first accumulation unit 1103 is reset. A signal represented by $$Vout2 = Voffset \qquad (9)$$

appears at the output terminal of the transmission unit 1104. After that, while the signal φPC0R is deactivated, and a signal φTN is activated, the signal Vout2 represented by equation (9) is transmitted from the first accumulation unit 1103 to a noise signal accumulation unit Ctn2 of the second accumulation unit 206 via a switch 1232. The noise signal accumulation unit Ctn2 of the second accumulation unit 206 holds the signal Vout2.

A first reset unit 709 may temporarily reset the potential of the second accumulation unit 206 before writing the signal in it.

During a period BLKb (i.e. second period) following the period BLKc (i.e. first period), the signal φVL is activated to input the noise signal (VN) output from a second pixel B11 to C0 via the column signal line RL1 and opening/closing unit 1101. While the signal φPC0R is active, the opening/closing unit 1102 is turned on. The two terminals of the capacitance Cf (Cf1, Cf2, Cf3) of the first accumulation unit 1103 are reset to Vref so that held electric charges are discharged to the power supply or GND, and a reset state is obtained. When the signal φPC0R is deactivated, the opening/closing unit 1102 is turned off to input the optical signal (VS+VN) output from the second pixel B11 to C0 via the column signal line RL1 and opening/closing unit 1101. At this time, the same signal as that of equation (7) appears at the output terminal of the transmission unit 1104. That is, a Vref-based output appears as Vout1, which is obtained by removing the noise component from the optical signal of the second pixel B11 and multiplying the resultant signal by the gain C0/Cf. Voffset is the offset of the transmission unit 1104. Hence, the first accumulation unit 1103 accumulates the same signal as that of equation (8) as the signal of the second pixel B11.

During the period BLKb (i.e. second period), while a signal HSR1 for the column signal line RL1 in a horizontal scanning signal HSR is active, switches 207 and 208 are ON to read out the signal of the first pixel A11 from the second accumulation unit 206. More specifically, the signal Vout1 of the first pixel A11 is read out from the optical signal accumulation unit Cts2 to a first horizontal output line 121 by capacitive division between the capacitance of the optical signal accumulation unit Cts2 and that of the first horizontal output line 121. Hence, the signal Vout1 of the first pixel A11 is transmitted to an output unit 120 via the first horizontal output line 121. The signal Vout2 of the first pixel A11 is read out from the noise signal accumulation unit Ctn2 to a second horizontal output line 122 by capacitive division between the capacitance of the noise signal accumulation unit Ctn2 and that of the second horizontal output line 122. Hence, the signal Vout2 of the first pixel A11 is transmitted to the output unit 120 via the second horizontal output line 122. The output unit 120 calculates $$\Delta V = Vout1 - Vout2 \qquad (10)$$
$$= (VS + VN - VN) * Co/Cf + Vref$$

as the difference between the signal Vout1 (equation (7)) transmitted via the first horizontal output line 121 and the signal Vout2 (equation (9)) transmitted via the second horizontal output line 122 and outputs the differential signal ΔV to the succeeding stage as an image signal. The differential signal ΔV is a signal obtained by removing the offset noise of the transmission unit 1104.

More specifically, the transmission unit 1104 in the readout circuit 810 performs the operation of transmitting a noise signal and the operation of transmitting an optical signal in the same column amplifier. Hence, the transmission unit 1104 can transmit noise and optical signals containing the same offset noise to the second accumulation unit 206. The output unit 120 of the succeeding stage calculates the difference between the noise signal and the optical signal, thereby obtaining an image signal from which the offset noise of the column amplifier has been removed. The transmission unit 1104 supplies a signal corresponding to electric charges held by the first accumulation unit 1103 to the second accumulation unit 206, instead of directly supplying the electric charges held by the first accumulation unit 1103 themselves to the second accumulation unit 206, as in the first embodiment.

Figure 16:
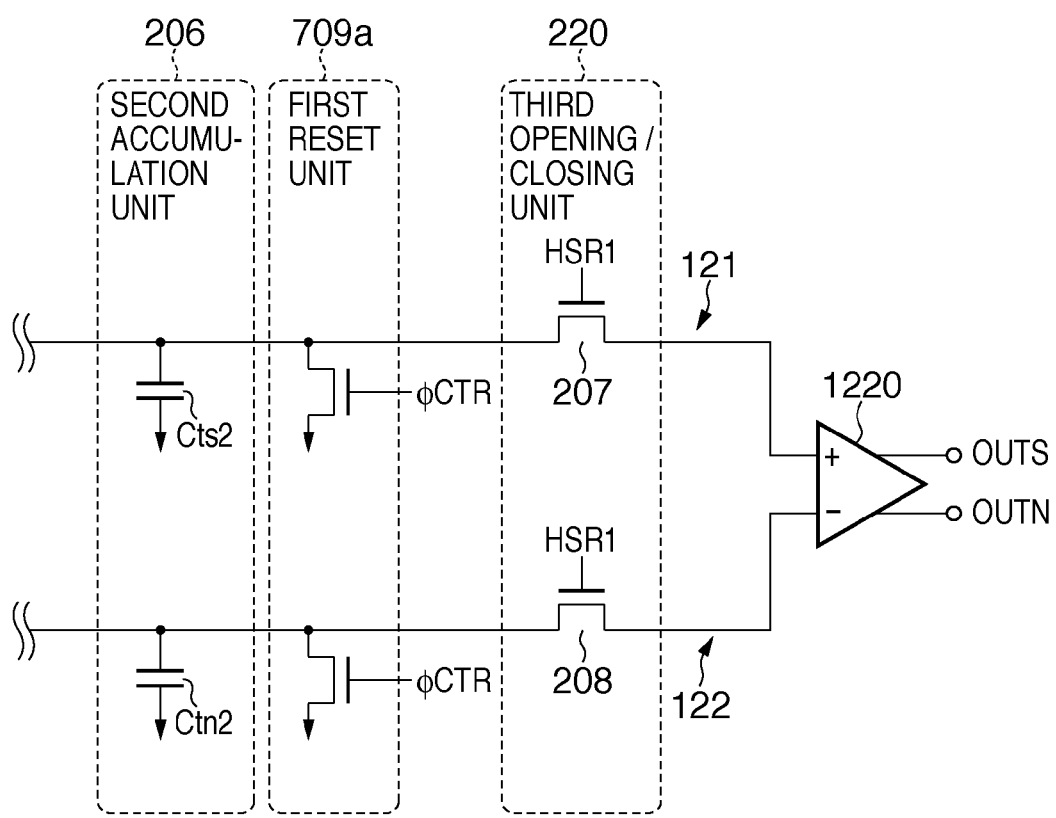
FIG. 16 is a circuit diagram showing the arrangement of an output unit.

An output unit 1220 of double end type may be used, as shown in FIG. 16.

The image sensing apparatus 800 may output only the signal Vout1 to the succeeding stage without providing the switch 1232, noise signal accumulation unit Ctn2, reset transistor MRN, and switch 208 in the readout circuit 810 shown in FIG. 14. A signal processing unit (FIG. 5) of the succeeding stage may remove the signal Vout2 of the offset component of each column of the transmission unit 1104.

For example, the output of a pixel called an OB pixel which is not irradiated with light in the image sensing apparatus 800 is obtained for each column. An OB pixel may have its photodiode shielded. Alternatively, a dark signal is obtained for each column. A signal output from the pixel as the signal Vout2 is saved in a memory unit 87 or the like as correction data. An image signal processing unit 97 or the like subtracts the signal Vout2 from the signal Vout1 in every shooting, thereby easily removing the offset component. The correction data may be saved during assembly of a camera or video, in every shooting, upon powering on a camera or video, or in accordance with a change in use situation of a camera or video.

When the transmission unit 1104 transmits a pixel signal during the period BLKa or BLKb, that is, when waiting for the period BLKc while holding a pixel signal in Cf, some kind of noise may enter the column signal line RL1. This can effectively be avoided by setting φVL in FIG. 15 as indicated by the solid line so that the opening/closing unit 1101 is temporarily opened at the end of the period BLKa or BLKb to sample and hold a pixel signal in Cf.

Figure 17:
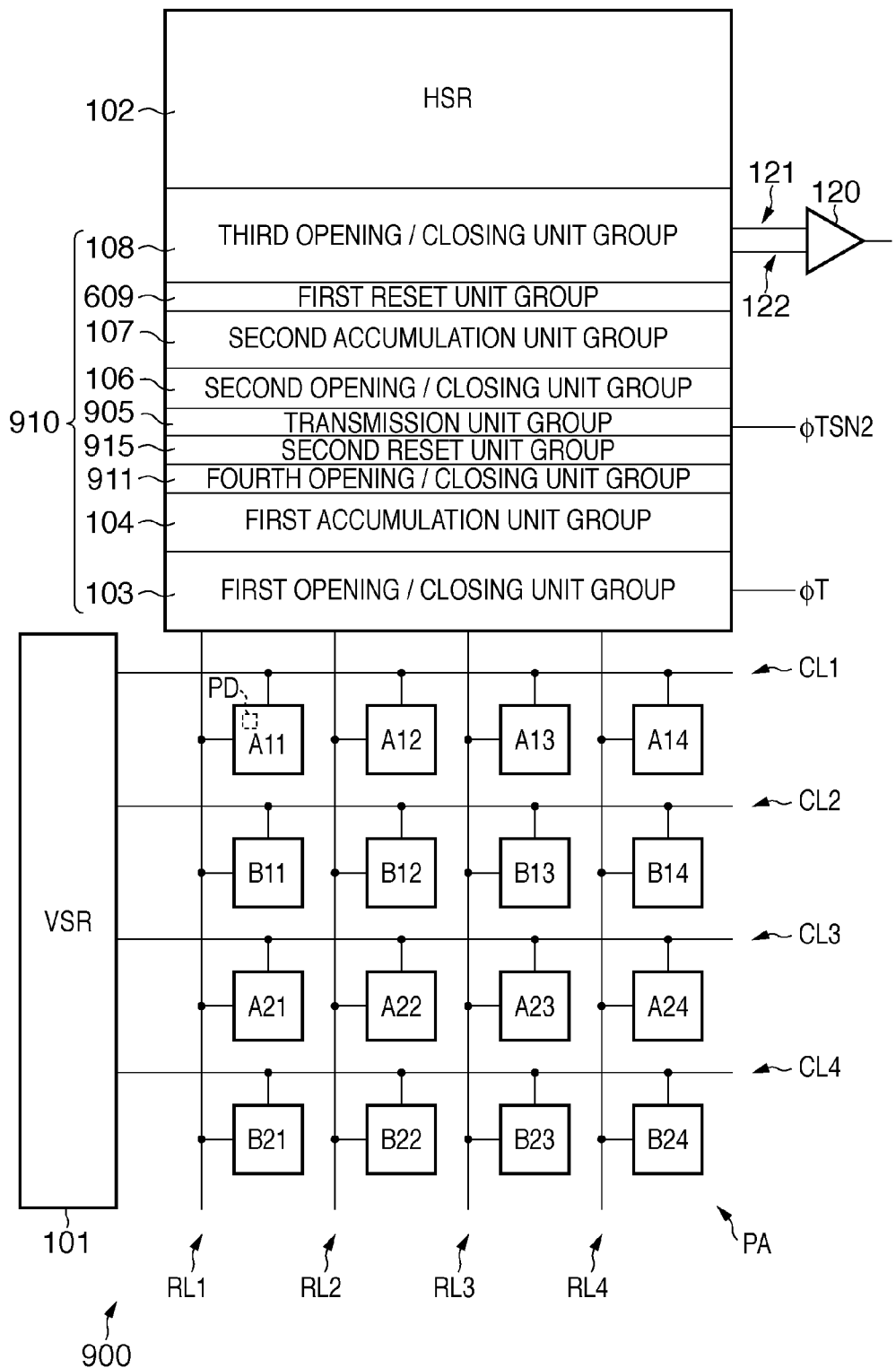
FIG. 17 is a view showing the arrangement of an image sensing apparatus 900 according to the fifth embodiment of the present invention.
Figure 18:
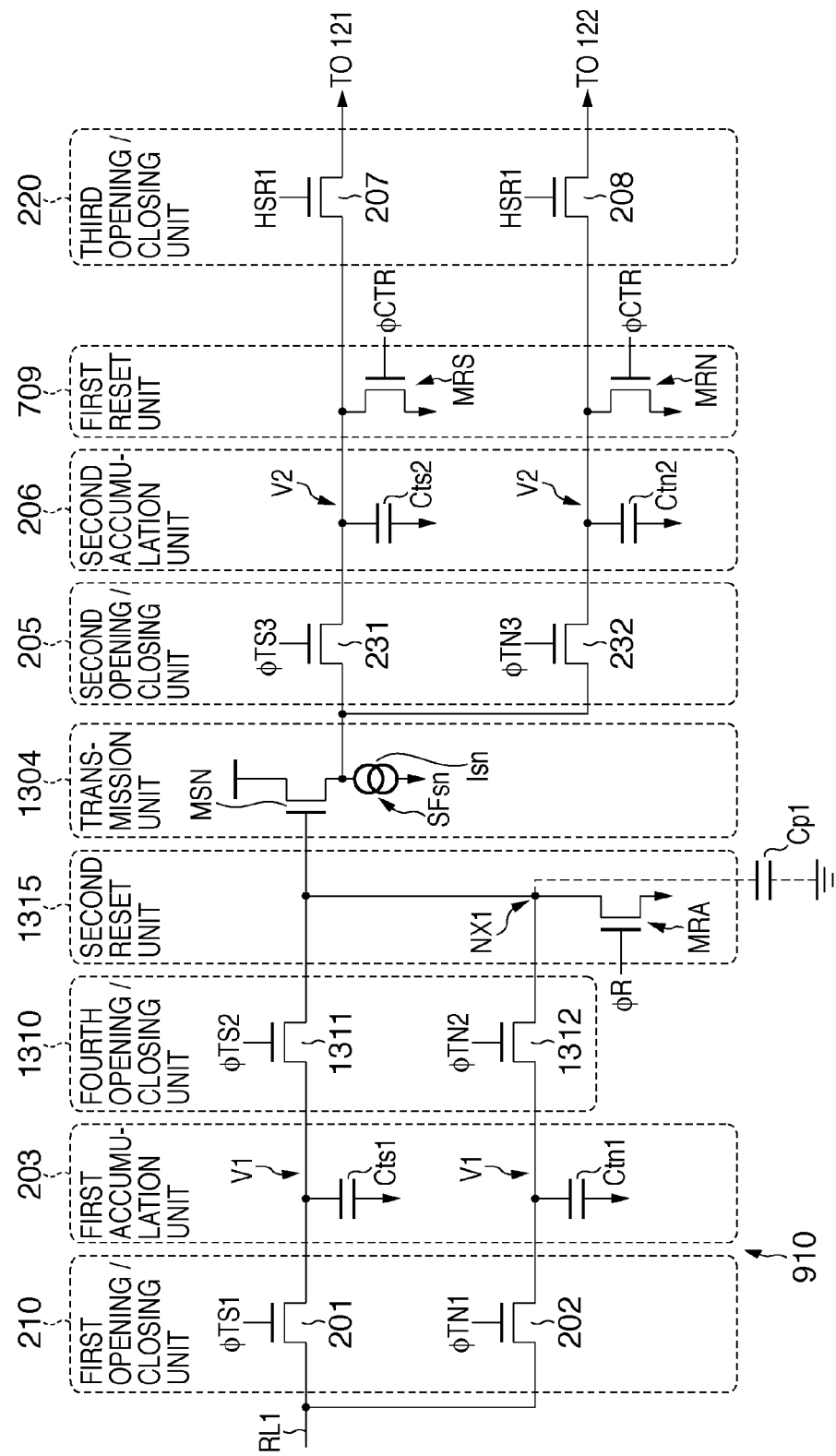
FIG. 18 is a circuit diagram showing the circuit arrangement of one column in a readout circuit.
Figure 19:
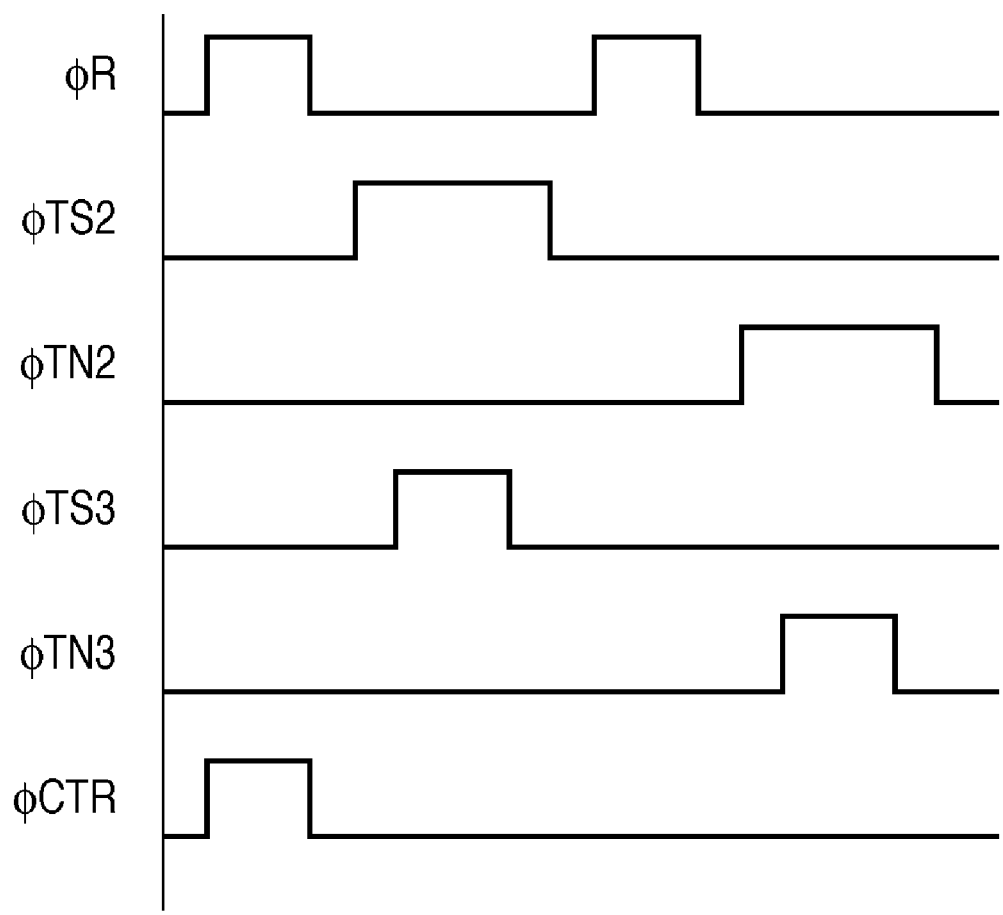
FIG. 19 is a timing chart showing the operation of the readout circuit.

An image sensing apparatus 900 according to the fifth embodiment of the present invention will be described next with reference to FIGS. 17 to 19. FIG. 17 is a view showing the arrangement of the image sensing apparatus 900 according to the fifth embodiment of the present invention. FIG. 18 is a circuit diagram showing the circuit arrangement of one column in a readout circuit. FIG. 19 is a timing chart showing the operation of the readout circuit. Portions different from the third embodiment will mainly be described below, and a description of the same portions will be omitted.

The image sensing apparatus 900 has the same basic arrangement as in the third embodiment except for a readout circuit 910. The readout circuit 610 is different from the third embodiment in that it includes a transmission unit group 905, second reset unit group 915, and fourth opening/closing unit group 911. The transmission unit group 905 includes a plurality of transmission units 1304 provided for the respective columns of a pixel array PA. The second reset unit group 915 includes a plurality of second reset units 1315 provided for the respective columns of the pixel array PA. The fourth opening/closing unit group 911 includes a plurality of fourth opening/closing units 1310 provided for the respective columns of the pixel array PA.

In the third embodiment, the transmission unit 504 transmits the noise signal and optical signal to the second accumulation unit 206 via the separate source followers SFs and SFn. For this reason, variations between the source followers SFs and SFn produce fixed pattern noise that degrades the image quality. That is, the noise signal and optical signal held by the second accumulation unit 206 contain different source follower offsets. More specifically, since the threshold voltage of the NMOS transistor MS of the source follower SFs is different from that of the NMOS transistor MN of the source follower SFn, offset noise cannot be removed by calculating the difference between the noise signal and the optical signal, and fixed pattern noise remains. The fixed pattern noise varies between the columns and therefore generates vertical stripe-shaped noise in the image based on the obtained image signal.

In the fifth embodiment, however, a first noise signal accumulation unit Ctn1 or a first optical signal accumulation unit Cts1 is selectively connected to the input terminal of the transmission unit 1304. A second noise signal accumulation unit Ctn2 or a second optical signal accumulation unit Cts2 is selectively connected to the output terminal. More specifically, the first noise signal accumulation unit Ctn1 is connected to the transmission unit 1304 via a noise signal switch 1312, whereas the first optical signal accumulation unit Cts1 is connected via an optical signal switch 1311. The second noise signal accumulation unit Ctn2 is connected to the transmission unit 1304 via a noise signal switch 232, whereas the second optical signal accumulation unit Cts2 is connected via an optical signal switch 231. This allows the transmission unit 1304 to selectively transmit the noise signal or optical signal to a second accumulation unit 206 via a common source follower SFsn. For this reason, the noise signal and optical signal held by the second accumulation unit 206 can contain the same fixed pattern noise. That is, the fixed pattern noise generated by variations in the threshold voltage of an NMOS transistor MSN of the source follower SFsn can be removed by calculating the difference between the noise signal and the optical signal.

The second reset unit 1315 includes a reset transistor MRA. The reset transistor MRA is also connected to the input terminal of the transmission unit 1304. The reset transistor MRA resets the potential of the gate of the NMOS transistor MSN of the source follower SFsn.

More specifically, the readout circuit 910 is driven as shown in FIG. 19. Note that φCRT is the same as that shown in FIG. 10.

During a period BLKc (i.e. first period, see FIG. 10), while φCTR is active, φR is active, too. The reset transistor MRA resets the potential of the gate of the NMOS transistor MSN of the source follower SFsn (to, e.g., ground level).

While φTS2 is active, φTS3 is active, too. The optical signal held by the first optical signal accumulation unit Cts1 is transmitted to the second optical signal accumulation unit Cts2 via the optical signal switch 1311, transmission unit 1304, and optical signal switch 231.

Then, φR is activated again. The reset transistor MRA resets the potential of the gate of the NMOS transistor MSN of the source follower SFsn again (to, e.g., ground level).

While φTN2 is active, φTN3 is active, too. The noise signal held by the first noise signal accumulation unit Ctn1 is transmitted to the second noise signal accumulation unit Ctn2 via the noise signal switch 1312, transmission unit 1304, and noise signal switch 232.

Why φR is activated again before activation of φTN2 to make the reset transistor MRA perform reset again will be described. The optical signal held by the first optical signal accumulation unit Cts1 changes depending on the amount of incident light. For this reason, a signal (residual signal) remaining in a parasitic capacitance Cp1 of the input terminal (input node NX1) of the transmission unit 1304 also largely varies depending on light. During the active period of φTN2, the transmission unit 1304 outputs, from the output terminal, a signal corresponding to the signal held by the first noise signal accumulation unit Ctn1 and the residual signal having variations. If φR is not activated again, the linearity given by the amount of incident light degrades. This may prevent a satisfactory signal from being obtained.

Figure 20:
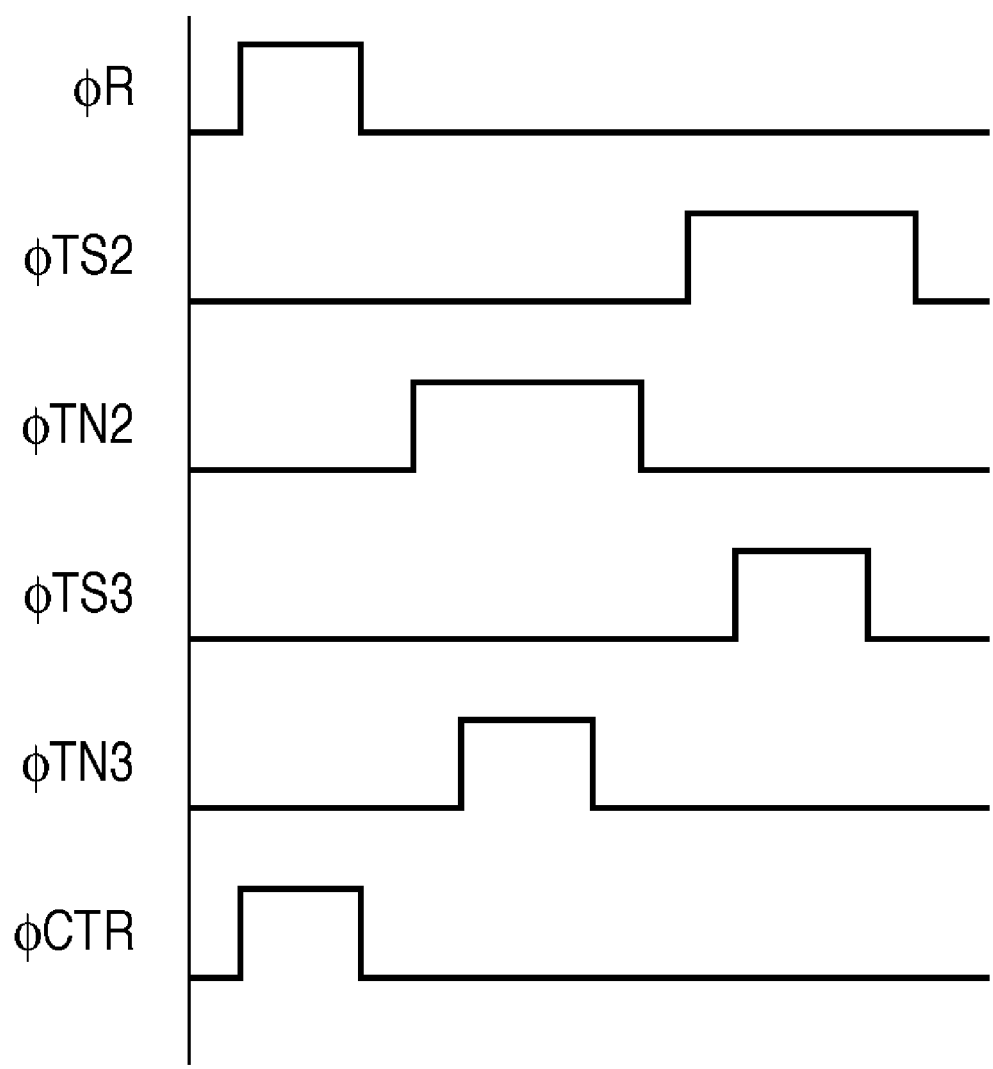
FIG. 20 is a timing chart showing the operation of the readout circuit.

If the active periods of φTN2 and φTN3 are placed before those of φTS2 and φTS3, as shown in FIG. 20, φR need not be activated again. The reason is as follows.

The noise signal held by the first noise signal accumulation unit Ctn1 is almost constant independently of the amount of incident light. For this reason, the signal (i.e. residual signal) remaining in the parasitic capacitance of the input terminal of the transmission unit 1304 is also almost constant independently of light. During the active period of φTS2, the transmission unit 1304 outputs, from the output terminal, a signal corresponding to the signal held by the first noise signal accumulation unit Ctn1 and the almost constant residual signal. Even if φR is not activated again, the linearity given by the amount of incident light does not degrade, and the gain only slightly decreases. The amount of gain decrease corresponds to the ratio of the parasitic capacitance of the input terminal of the transmission unit 1304 to the capacitance value of the first optical signal accumulation unit Cts1.

The parasitic capacitance of the transmission unit 1304 is, for example, several ten fF. The capacitance of the first optical signal accumulation unit Cts1 is normally designed to be several pF. In this case, the amount of gain decrease is several percent with respect to that in the driving method shown in FIG. 19, resulting in no problem. The driving method in FIG. 20 can shorten the readout time as compared to that in FIG. 19 because φR is not activated again.

Figure 21:
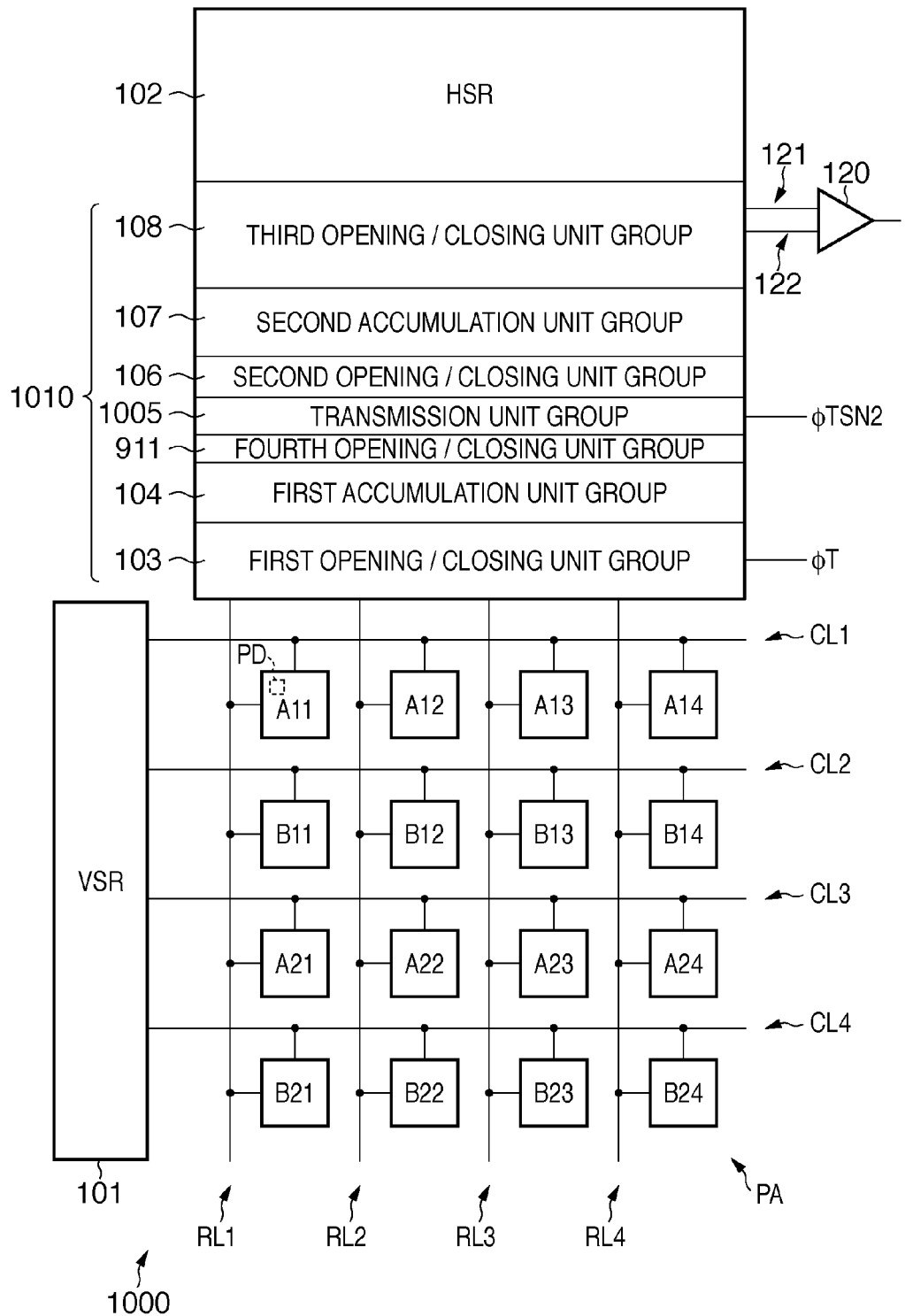
FIG. 21 is a view showing the arrangement of an image sensing apparatus 1000 according to the sixth embodiment of the present invention.
Figure 22:
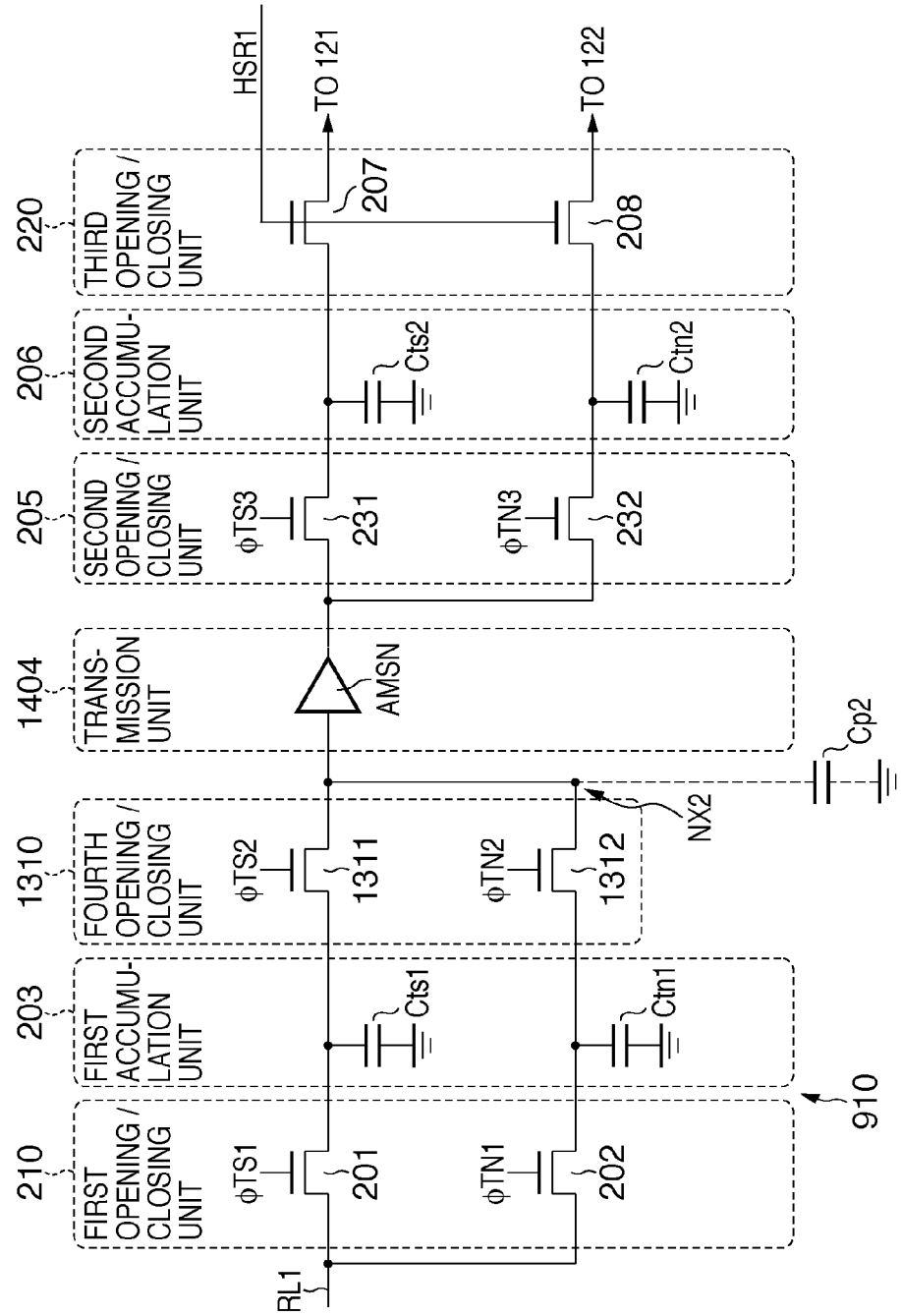
FIG. 22 is a circuit diagram showing the circuit arrangement of one column in a readout circuit.
Figure 23:
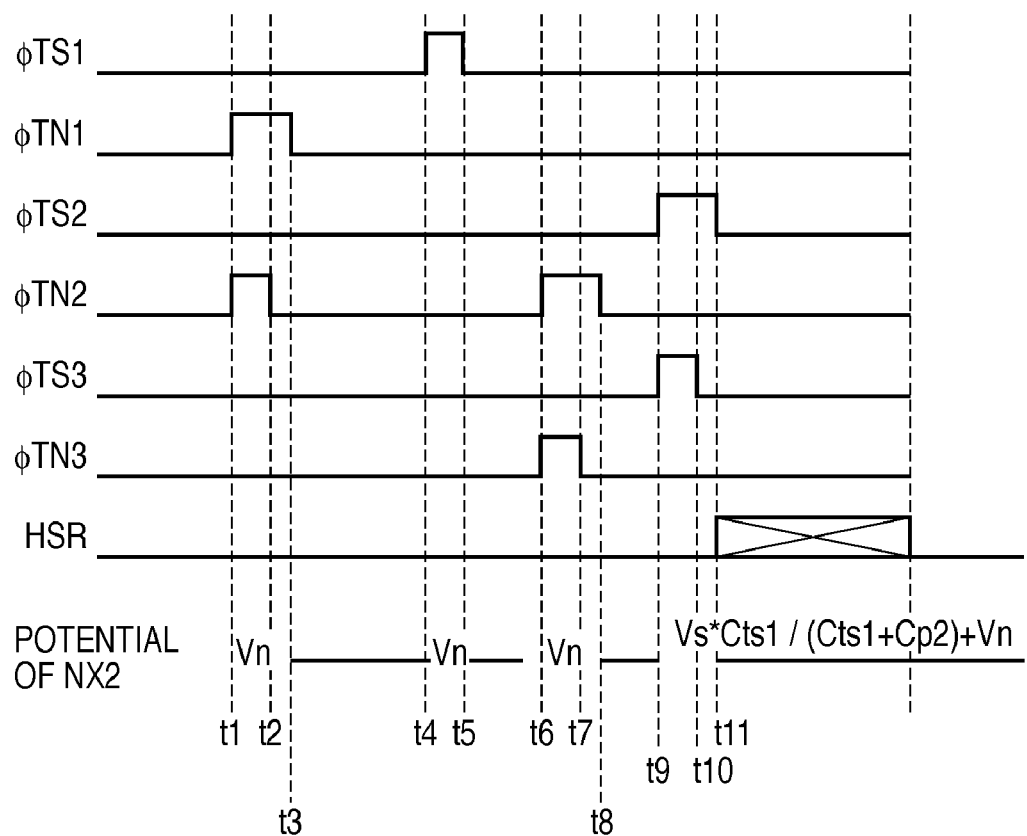
FIG. 23 is a timing chart showing the operation of the readout circuit.

An image sensing apparatus 1000 according to the sixth embodiment of the present invention will be described next with reference to FIGS. 21 to 23. FIG. 21 is a view showing the arrangement of the image sensing apparatus 1000 according to the sixth embodiment of the present invention. FIG. 22 is a circuit diagram showing the circuit arrangement of one column in a readout circuit. FIG. 23 is a timing chart showing the operation of the readout circuit. Portions different from the fifth embodiment will mainly be described below, and a description of the same portions will be omitted.

The image sensing apparatus 1000 has the same basic arrangement as in the fifth embodiment except for a readout circuit 1010. The readout circuit 1010 is different from the fifth embodiment in that it has neither a first reset unit group 609 nor a second reset unit group 915 but includes a transmission unit group 1005. The transmission unit group 1005 includes a plurality of transmission units 1404 provided for the respective columns of a pixel array PA.

The transmission unit 1404 includes a buffer amplifier AMSN common to a noise signal and an optical signal. Since the common buffer amplifier AMSN can selectively transmit the noise signal or optical signal held by a first accumulation unit 203 to a second accumulation unit 206, the noise signal and optical signal held by the second accumulation unit 206 can contain the same fixed pattern noise, as in the fifth embodiment.

The buffer amplifier AMSN amplifies and outputs an input signal, like the source follower SFsn of the fifth embodiment.

In the fifth embodiment, the reset transistor MRA (see FIG. 18) resets (initializes) the parasitic capacitance Cp1 of the input node NX1 of the source follower SFsn. This removes residual charges from the parasitic capacitance Cp1 and prevents degradation of the linearity given by the amount of incident light.

In the sixth embodiment, the degradation of the linearity given by the amount of incident light is prevented, without providing a transistor for resetting a parasitic capacitance Cp2 of an input node NX2 of the buffer amplifier AMSN, by the following operation.

The operation of the readout circuit 1010 is different from the fifth embodiment in the following points, as shown in FIG. 23.

At timing t1, φTN1 is activated to transfer a noise signal from a column signal line RL1 to a noise signal accumulation unit Ctn1. Simultaneously, φTN2 is activated to transfer the noise signal to the input node NX2 of the buffer amplifier AMSN and set the potential of the input node NX2 to a reset level Vn. That is, the initial potential Vn of the input node NX2 is equal to the potential of the noise signal accumulation unit Ctn1. Since the input node NX2 is reset using the noise signal output from a pixel, it is possible to reset the parasitic capacitance Cp2 without the transistor for resetting it.

At timing t2, φTN2 is deactivated to disconnect the path from the column signal line RL1 to the node NX2. Reset of the parasitic capacitance Cp2 is thus completed.

At timing t3, φTN1 is deactivated. Since a noise signal switch 202 is turned off, the noise signal accumulation unit Ctn1 holds the noise signal.

At timing t4, φTS1 is activated. A switch 201 is turned on to transfer, to an optical signal accumulation unit Cts1, an optical signal transmitted via the column signal line RL1.

At timing t5, φTS1 is deactivated. The switch 201 is turned off, and the optical signal accumulation unit Cts1 holds the transferred optical signal. Let Vs be the signal voltage at that time. The optical signal accumulation unit Cts1 saves a voltage (Vn+Vs).

At timing t6, φTN2 is activated to read out the noise signal held by the noise signal accumulation unit Ctn1 to the node NX2 by capacitive division between the capacitance value of the noise signal accumulation unit Ctn1 and that of the parasitic capacitance Cp2. At this time, since both the voltage held by the noise signal accumulation unit Ctn1 and that held by the parasitic capacitance Cp2 are Vn, the voltage of the node NX2 does not change. That is, the noise signal read out to the node NX2 is $$Vxn = Vn \qquad (11)$$

Additionally, φTN3 is activated to transmit the noise signal read out to the node NX2 to a noise signal accumulation unit Ctn2 via the buffer amplifier AMSN.

At timing t7, φTN3 is deactivated. Since a switch 232 is turned off, the noise signal accumulation unit Ctn2 holds the transferred noise signal.

At timing t8, φTN2 is deactivated to turn off a switch 1312.

At timing t9, φTS2 is activated to read out the optical signal held by the optical signal accumulation unit Cts1 to the node NX2 by capacitive division between the capacitance value of the optical signal accumulation unit Cts1 and that of the parasitic capacitance Cp2.

Let C1 be the capacitance value of the optical signal accumulation unit Cts1. An electrode which faces the reference-side (ground-side) electrode of the optical signal accumulation unit Cts1 accumulates electric charges represented by $$Q1 = C1*(Vs+Vn) \qquad (12)$$

Let Cp be the capacitance value of the parasitic capacitance Cp2. The node NX2 accumulates electric charges represented by $$Qp = Cp*Vn \qquad (13)$$

The optical signal read out to the node NX2 is given by $$Vxs = (Q1+Qp)/(C1+Cp) \qquad (14)$$
$$= \{C1/(C1+Cp)\}*Vs + Vn$$

Additionally, φTS3 is activated to transmit the optical signal read out to the node NX2 to an optical signal accumulation unit Cts2 via the buffer amplifier AMSN.

At timing t10, φTS3 is deactivated. Since a switch 231 is turned off, the optical signal accumulation unit Cts2 holds the transferred optical signal.

At timing t11, φTS2 is deactivated to turn off a switch 1311.

Then, an output unit 120 (see FIG. 21) calculates the difference between Vxn represented by equation (11) and Vxs represented by equation (14) to generate an image signal given by $$\Delta V = Vxn - Vxs \qquad (15)$$
$$= \{C1/(C1+Cp)\} * Vs$$

The image signal ΔV from which the noise signal Vn has been removed is obtained, as indicated by equation (15).

As described above, according to this embodiment, it is possible to reset the parasitic capacitance of the input node of the transmission unit without providing the second reset unit (reset transistor MRA). This prevents degradation of the linearity given by the amount of incident light.

In the sixth embodiment, the node NX2 is reset such that the noise signal accumulation unit Ctn1 and node NX2 are equipotential. After that, the noise signal held by the accumulation unit Ctn1 is read out to the node NX2 by capacitive division between the capacitance value of the noise signal accumulation unit Ctn1 and that of the parasitic capacitance Cp2 of the node NX2.

Instead, the node NX2 may be reset such that the optical signal accumulation unit Cts1 and node NX2 are equipotential. After that, the optical signal held by the accumulation unit Cts1 may be read out to the node NX2 by capacitive division between the capacitance value of the optical signal accumulation unit Cts1 and that of the parasitic capacitance Cp2 of the node NX2.

Figure 24:
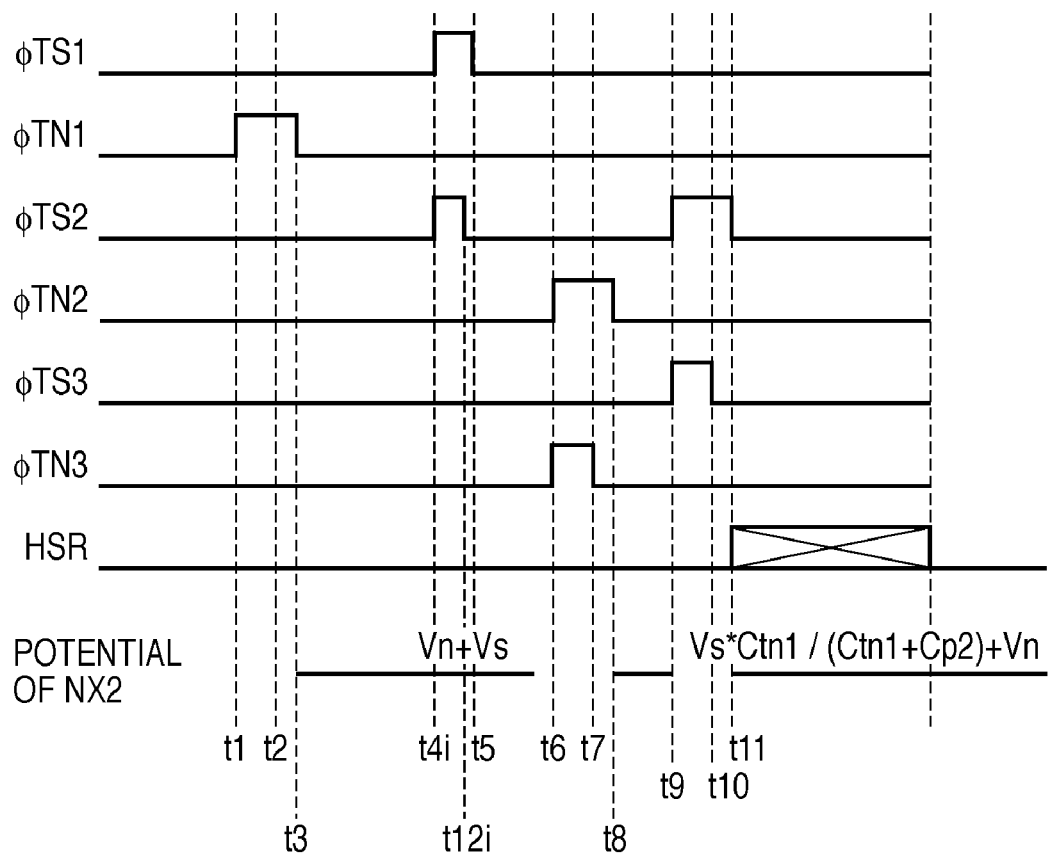
FIG. 24 is a timing chart showing the operation of the readout circuit.

In this case, φTS2 is activated during the period from time t4i to t12i instead of activating φTN2 during the period from time t1 to t2 (see FIG. 23), as shown in FIG. 24.

At time t12i, φTS2 is deactivated. Each of the optical signal accumulation unit Cts1 and node NX2 saves the voltage (Vn+ Vs). Since the input node NX2 is reset using the optical signal output from a pixel, it is possible to reset the parasitic capacitance Cp2 without the transistor for resetting it.

At timing t6, φTN2 is activated to read out the noise signal held by the noise signal accumulation unit Ctn1 to the node NX2 by capacitive division between the capacitance value of the noise signal accumulation unit Ctn1 and that of the parasitic capacitance Cp2.

Let C2 be the capacitance value of the noise signal accumulation unit Ctn1. An electrode which faces the reference-side (ground-side) electrode of the noise signal accumulation unit Ctn1 accumulates electric charges represented by $$Q2 = C2 * Vn \qquad (16)$$

Let Cp be the capacitance value of the parasitic capacitance Cp2. The node NX2 accumulates electric charges represented by $$Qp = Cp * (Vs+Vn) \qquad (17)$$

The noise signal read out to the node NX2 is given by $$Vxn = (Q2+Qp)/(C2+Cp) \qquad (18)$$
$$= \{Cp/(C2+Cp)\} * Vs + Vn$$

At timing t9, φTS2 is activated to read out the optical signal held by the optical signal accumulation unit Cts1 to the node NX2 by capacitive division between the capacitance value of the optical signal accumulation unit Cts1 and that of the parasitic capacitance Cp2. At this time, the optical signal read out to the node NX2 is given by $$Vxs = Vs + Vn \qquad (19)$$

Then, the output unit 120 (see FIG. 21) calculates the difference between Vxn represented by equation (18) and Vxs represented by equation (19) to generate an image signal given by $$\Delta V = Vxn - Vxs \qquad (20)$$
$$= \{C2/(C2+Cp)\} * Vs$$

The image signal ΔV from which the noise signal Vn has been removed is obtained, as indicated by equation (20).

As described above, according to this modification, it is possible to reset the parasitic capacitance of the input node of the transmission unit without providing the second reset unit (reset transistor MRA depicted in FIG. 18). This prevents degradation of the linearity given by the incident light amount.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2007-240182, filed Sep. 14, 2007, and 2008-217326, filed Aug. 26, 2008, which are hereby incorporated by reference herein in their entirety.

What is claimed is:

1. An image sensing apparatus comprising:
a pixel including a photoelectric conversion unit;
a column signal line connected to the pixel;
a readout circuit that reads out a signal from the pixel via the column signal line;
an output line connected to the readout circuit and having a capacitance; and
an output unit that outputs an image signal in accordance with the signal that is output to the output line from the readout circuit,
wherein the readout circuit includes:
a first accumulation unit that holds the signal read out to the column signal line,
a first opening/closing unit that opens/closes a connection between the column signal line and the first accumulation unit,
a second accumulation unit,
a transmission unit that transmits the signal held by the first accumulation unit to the second accumulation unit, and
a second opening/closing unit that opens/closes a connection between the transmission unit and the second accumulation unit,
wherein a capacitance of the first accumulation unit is smaller than a capacitance of the second accumulation unit, and
wherein the signal held by the second accumulation unit is read out to the output unit based on the capacitance of the second accumulation unit and the capacitance of the output line.

2. The apparatus according to claim 1, wherein
the readout circuit further includes a third opening/closing unit that opens/closes a connection between the second accumulation unit and the output line,
the third opening/closing unit setting the connection between the second accumulation unit and the output line in a closing state to connect the second accumulation unit to the output line and read out the signal held by the second accumulation unit.

3. The apparatus according to claim 1, wherein
the transmission unit supplies a signal corresponding to electric charges held by the first accumulation unit to the second accumulation unit.

4. The apparatus according to claim 3, wherein
the transmission unit includes a MOS transistor, and
the MOS transistor receives, via a gate, the signal held by the first accumulation unit and outputs, to the second accumulation unit via a source, a signal corresponding to the signal input to the gate.

5. The apparatus according to claim 1, wherein
the readout circuit further includes a reset unit that resets a potential of the second accumulation unit.

6. The apparatus according to claim 5, wherein
the transmission unit includes an NMOS transistor,
letting V1 be a potential of the first accumulation unit, Vthn be a threshold voltage of the NMOS transistor, and V2 be the potential of the second accumulation unit, the reset unit resets the potential V2 of the second accumulation unit electrically disconnected from the transmission unit to satisfy $V2 \leq V1-Vthn$, and when electrically connected to the second accumulation unit, the NMOS transistor raises the potential of the second accumulation unit from the potential reset by the reset unit to a potential corresponding to the signal held by the first accumulation unit.

7. The apparatus according to claim 5, wherein
the transmission unit includes a PMOS transistor,
letting V1 be a potential of the first accumulation unit, Vthp be a threshold voltage of the PMOS transistor, and V2 be the potential of the second accumulation unit, the reset unit resets the potential V2 of the second accumulation unit electrically disconnected from the transmission unit to satisfy $V2 \geq V1-Vthp$, and when electrically connected to the second accumulation unit, the PMOS transistor lowers the potential of the second accumulation unit from the potential reset by the reset unit to a potential corresponding to the signal held by the first accumulation unit.

8. The apparatus according to claim 1, wherein
the first accumulation unit includes
a first noise signal accumulation unit that holds a noise signal output to the column signal line, and
a first optical signal accumulation unit that holds an optical signal output to the column signal line,
wherein the second accumulation unit includes
a second noise signal accumulation unit to which the signal held by the first noise signal accumulation unit is transmitted, and
a second optical signal accumulation unit to which the signal held by the first optical signal accumulation unit is transmitted,
wherein the transmission unit has an input terminal connected to the first noise signal accumulation unit and the first optical signal accumulation unit and an output terminal connected to the second noise signal accumulation unit and the second optical signal accumulation unit, and
wherein the output unit outputs the image signal by calculating a difference between the signal held by the second noise signal accumulation unit and the signal held by the second optical signal accumulation unit.

9. The apparatus according to claim 1, wherein
a first pixel and a second pixel are connected to the column signal line,
wherein, during a first period, the transmission unit transmits a signal of the first pixel from the first accumulation unit to the second accumulation unit, and
wherein, during a second period following the first period, an operation in which the first accumulation unit accumulates a signal of the second pixel that is output to the column signal line and an operation in which the signal of the first pixel is transmitted from the second accumulation unit to the output unit are performed in parallel.

10. The apparatus according to claim 9, wherein
the first period is shorter than the second period.

11. An image sensing apparatus comprising:
a first pixel;
a second pixel;
a column signal line connected to the first pixel and the second pixel;
a readout circuit that reads out a signal from the first pixel and the second pixel via the column signal line;
a driving unit that drives the first pixel, the second pixel, and the readout circuit;
an output line connected to the readout circuit and having a capacitance; and
an output unit that outputs an image signal in accordance with the signal that is output to the output line from the readout circuit,
wherein the readout circuit includes:
 a first accumulation unit that holds the signal read out to the column signal line,
 a first opening/closing unit that opens/closes a connection between the column signal line and the first accumulation unit,
 a second accumulation unit,
 a transmission unit that transmits the signal held by the first accumulation unit to the second accumulation unit, an input terminal and an output terminal of the transmission unit being connected to the first accumulation unit, and the output terminal of the transmission unit also being connected to the second accumulation unit, and
 a second opening/closing unit that opens/closes a connection between the first accumulation unit and the transmission unit, and the second accumulation unit,
wherein a capacitance of the first accumulation unit is smaller than a capacitance of the second accumulation unit,
wherein the signal held by the second accumulation unit is read out to the output unit based on the capacitance of the second accumulation unit and the capacitance of the output line, and
wherein the driving unit drives the first pixel, the second pixel, and the readout circuit such that, during a first period, a signal of the first pixel is transmitted from the first accumulation unit to the second accumulation unit via the transmission unit, and during a second period following the first period, an operation in which the first accumulation unit accumulates a signal of the second pixel that is output to the column signal line and an operation in which the signal of the first pixel is transmitted from the second accumulation unit to the output unit are performed in parallel.

12. The apparatus according to claim 11, wherein the transmission unit calculates a difference between a signal fed back from the output terminal via the first accumulation unit and a signal based on the signal output to the column signal line, and outputs a differential signal.

13. The image sensing apparatus according to claim 1, wherein the image sensing apparatus is incorporated into an imaging system that includes:
an optical system that forms an image on an imaging plane of the image sensing apparatus; and
a signal processing unit that processes a signal output from the image sensing apparatus to generate image data.

14. The image sensing apparatus according to claim 11, wherein the image sensing apparatus is incorporated into an imaging system that includes:
an optical system that forms an image on an imaging plane of the image sensing apparatus; and
a signal processing unit that processes a signal output from the image sensing apparatus to generate image data.

15. The apparatus according to claim 1, wherein the transmission unit is an impedance converter.

16. The apparatus according to claim 11, wherein the transmission unit is an impedance converter.

* * * * *